United States Patent
Limburg et al.

(10) Patent No.: US 12,455,247 B2
(45) Date of Patent: Oct. 28, 2025

(54) DEVICES AND METHOD FOR MEASURING AN ANALYTE CONCENTRATION IN A SAMPLE OF BODILY FLUID

(71) Applicant: Roche Diabetes Care, Inc., Indianapolis, IN (US)

(72) Inventors: Bernd Limburg, Soergenloch (DE); Max Berg, Mannheim (DE); Daniel Sieffert, Mannheim (DE); Fredrik Hailer, Mannheim (DE); Christian Hoertz, Worms (DE)

(73) Assignee: ROCHE DIABETES CARE, INC., Indianapolis, IN (US)

( * ) Notice: Subject to any disclaimer, the term of this patent is extended or adjusted under 35 U.S.C. 154(b) by 665 days.

(21) Appl. No.: 17/290,343

(22) PCT Filed: Oct. 29, 2019

(86) PCT No.: PCT/EP2019/079445
§ 371 (c)(1),
(2) Date: Apr. 30, 2021

(87) PCT Pub. No.: WO2020/089188
PCT Pub. Date: May 7, 2020

(65) Prior Publication Data
US 2022/0003683 A1    Jan. 6, 2022

(30) Foreign Application Priority Data
Oct. 31, 2018 (EP) .................... 18203789

(51) Int. Cl.
*G01N 21/78* (2006.01)
*G01N 21/77* (2006.01)
*G06T 7/00* (2017.01)

(52) U.S. Cl.
CPC .......... *G01N 21/78* (2013.01); *G06T 7/0014* (2013.01); *G01N 2021/7759* (2013.01); *G06T 2207/30024* (2013.01)

(58) Field of Classification Search
CPC .......... G01N 21/78; G01N 2021/7759; G01N 33/4875; G01N 21/8483; G01N 21/27; G06T 7/0014; G06T 2207/30024
See application file for complete search history.

(56) References Cited

U.S. PATENT DOCUMENTS 6,063,337 A    5/2000 Markart
6,696,240 B1 *  2/2004 Kloepfer .............. G01N 33/558
                                              435/287.9

(Continued)

FOREIGN PATENT DOCUMENTS

CN    1573316     2/2005
CN    102209891   10/2011

(Continued)

OTHER PUBLICATIONS

International Search Report and Written Opinion for PCT/EP2019/079445 mailed Jan. 22, 2020.

*Primary Examiner* — Lore R Jarrett
(74) *Attorney, Agent, or Firm* — Woodard, Emhardt, Henry, Reeves & Wagner, LLP

(57) ABSTRACT

An optical test strip (118) for measuring an analyte concentration in a sample of bodily fluid is disclosed. The optical test strip (118) comprises:
a) a bottom layer (116) having a first end (130);
b) a top layer (110) having a first end (132) essentially aligned with the first end (130) of the bottom layer (116);
c) at least one spacer layer (114) interposed between the bottom layer (116) and the top layer (110), the spacer layer (114) having a length shorter than the bottom layer (116) and shorter than the top layer (110) such that the top layer (110) and the bottom layer (116) protrude over the spacer layer (114), wherein the first end (130) of the bottom layer (116), the first end (132) of the top layer (110), and the spacer layer (114) form a sample receiving area (140) which at least partially has capillary properties for receiving the sample of bodily fluid; and
d) at least one test field (112), wherein the test field (112) comprises a test chemical being configured for performing an optically detectable detection reaction with the analyte, wherein the test field (112) comprises at least one first region (126) and at least one second region (128), wherein the first region (126) faces the sample receiving area (140), wherein the first region (126) is configured to be at least partly wetted by the (Continued)

sample of bodily fluid upon sample application, wherein the second region (128) is covered by the spacer layer (114) such that the second region (128) is essentially inaccessible for the sample of bodily fluid.

28 Claims, 3 Drawing Sheets

(56) References Cited

U.S. PATENT DOCUMENTS

| | | | |
|---|---|---|---|
| 8,992,750 B1* | 3/2015 | Beaty | G01N 27/02 |
| | | | 204/194 |
| 2003/0026734 A1 | 2/2003 | Modzelewski et al. | |
| 2003/0031592 A1 | 2/2003 | Knappe | |
| 2004/0071331 A1 | 4/2004 | Lawless et al. | |
| 2008/0105024 A1 | 5/2008 | Creaven et al. | |
| 2008/0257725 A1 | 10/2008 | Gotoh et al. | |
| 2011/0048940 A1 | 3/2011 | Wang et al. | |
| 2013/0267032 A1 | 10/2013 | Tsai et al. | |
| 2017/0184506 A1 | 6/2017 | Patel | |
| 2017/0254772 A1* | 9/2017 | Bauer-Espindola | C12Q 1/006 |
| 2019/0079045 A1 | 3/2019 | Goebbert et al. | |

FOREIGN PATENT DOCUMENTS

| | | |
|---|---|---|
| CN | 104081207 | 10/2014 |
| EP | 0 287 883 A1 | 10/1988 |
| EP | 1 211 321 B1 | 9/2014 |
| FI | 126816 B | 6/2017 |
| TW | 200626897 | 8/2006 |
| TW | 201942709 | 11/2019 |
| WO | WO 2007038464 | 4/2007 |
| WO | WO 2008074504 | 6/2008 |
| WO | WO 2011/025693 | 3/2011 |
| WO | WO 2015187580 | 12/2015 |
| WO | WO 2016073395 | 5/2016 |

* cited by examiner

DEVICES AND METHOD FOR MEASURING AN ANALYTE CONCENTRATION IN A SAMPLE OF BODILY FLUID

TECHNICAL FIELD

The present invention relates to an optical test strip as well as to a kit for measuring an analyte concentration in a sample of bodily fluid. The invention further relates to a mobile device. The invention further relates to a method for producing a test strip and a method for measuring an analyte concentration in a sample of bodily fluid. The invention further relates to a computer program with program means for performing the method for measuring an analyte concentration according to the invention. Optical test strips, kits, mobile device, computer program and methods according to the present invention may be used in medical diagnostics, in order to quantitatively or qualitatively detect and/or measure a concentration of one or more analytes in one or more bodily fluids. Other fields of application of the present invention are also feasible.

BACKGROUND ART

In the field of medical diagnostics, in many cases, concentrations of one or more analytes in samples of body fluids, such as blood, interstitial fluid, urine, saliva or other types of bodily fluids have to be detected and/or measured. Examples of analytes to be detected are glucose, triglycerides, lactate, cholesterol or other types of analytes typically present in these body fluids. According to the concentration and/or the presence of the analyte, an appropriate treatment may be chosen, if necessary.

Generally, devices and methods known to the skilled person make use of test elements comprising one or more test chemistries, which, in presence of the analyte to be detected, are capable of performing one or more detectable detection reactions, such as optically detectable detection reactions.

Several designs and setups of a test element for optical or electrochemical measurements are known. For example, WO 2007/038464 A1 describes in vitro electrochemical sensors for analysis of a sample of biological fluid. Embodiments include sensors that include a sample chambers having overhangs extending therefrom. US 2008/0257725 A1 describes a biosensor which comprises a space part for sucking and housing a sample formed of two upper and lower plates, the two plates being stuck together by an adhesive layer, the space part for sucking and housing the sample being constituted so as to be partially opened in the peripheral part and partially closed by the adhesive layer, and has a working electrode having at least glucose oxidase immobilized thereon and a counter electrode on the same plane of the plate. WO 2011/025693 A1 describes small volume analyte sensors having large sample fill ports, supported analyte sensors, analyte sensors having supported tip protrusions and methods of making and using same.

US 2004/0071331 A1 describes a self-contained system which uses light reflectivity to examine intensity of a dyed spot on a device membrane surrounded by background area to discern information about the specimen that produced the spot. A master clock alternatively drives one LED focussed upon the spot center, and then drives two LEDS focused on the background area. Light reflected from the spot and background is detected by preferably two photodetectors ("PDs") spaced-apart a multiple of 90° azimuthal, a configuration discovered to minimize the effects of uneven membrane topography upon light intensity measurements. The PD outputs are average-summed together and are input to a phase lock-in amplifier system that enhances detected signal/noise by measuring signal voltage without producing noise. The lock-in system simultaneously positively and negatively amplifies the average-summed PD outputs, which amplified signal is then switched in synchronism with the LED drive signals. Only in-phase signals occurring during the active LED drive signal portion are sampled, and signal components present in the average-summed together PD output are essentially doubled in effective amplitude, thereby enhancing signal to noise ratios. The output of the switch is lowpass filtered to recover a noise-free DC level proportional to detected light intensity. A readout of the DC level provides an accurate measurement of the spot intensity.

WO 2008/074504 A1 describes a system for determining the concentration of an analyte in a liquid by absorption measurement comprising a test element having a detection region, which contains at least one reaction region with reagents for detecting the analyte, which cause a change in the absorption behavior upon reaction with the analyte, and the detection region contains at least one reference region in which the absorption behavior is essentially not changed by the analyte. Furthermore, the system contains a detection unit for the spatially resolved detection of light intensities which are received by the detection region, and an evaluation unit for evaluating signals of the detection unit. The system is characterized in that the reaction regions and the reference regions are arranged alternately in two dimensions.

EP 1 211 321 B1 describes a biosensor that includes first and second plate elements, wherein each plate elements has first and second ends and first and second lateral borders. In addition, the biosensor includes a spacer positioned to lie between the first and second plate elements so that at least a portion of the first and second plate elements cooperate with one another to form opposite walls of a capillary space. Further, the first ends and at least a portion of the lateral borders define a fluid sample-receiving portion in communication with the capillary space. Electrodes are positioned in the capillary space of the biosensor.

U.S. Pat. No. 8,992,750 B1 describes a test strip with a sample chamber opening spanning the width of the test strip at the sampling end and including a portion of the lateral sides at that end.

The chamber is vertically bounded by upper and lower substrate layers, horizontally bounded by the front face of a spacer layer, and open on the remaining sides. The test strip fills rapidly and requires small sample volumes.

WO 2015/187580 A1 describes a method for verifying test element integrity including a biosensor having an electrode-support substrate. A first electrode is provided on the substrate that includes a first body and a neck extending from the first body. A second electrode is provided on the substrate that includes a second body and an opposite pair of necks. Each of the necks extends from a respective end of the second body. A spacer is positioned on the substrate and has an edge defining a boundary of a capillary channel formed between a cover and the substrate. The method also includes applying a signal across the necks of the second electrode to verify continuity along the second electrode. The second body of the second electrode and the pair of connective necks surround the first electrode in the capillary channel forming a loop circuit around the first electrode.

WO 2016/073395 A1 describes electrode arrangements for test elements, test elements and methods of determining sample sufficiency, monitoring fill time, establishing fill directions and/or confirming electrode coverage by a sample for test elements. The test elements have an electrode-support substrate including a spacer having an edge defining a boundary of a capillary channel. The electrode-support substrate also includes a first electrode pair and a second electrode pair, wherein the first electrode pair is positioned between the second electrode pair. The method includes dosing the test sensor with the fluid sample; applying a signal to the first electrode pair and the second electrode pair, detecting a first response to the signal from the first electrode pair, and detecting a second response to the signal from the second electrode pair; determining a time period between the first response and the second response US 2013/267032 A1 describes a specimen test strip to detect a characteristic of an analyte in a specimen sample. The specimen test strip includes a reaction area to receive the specimen sample and a color calibration area to determine a color, or a color and a color intensity, of the reaction area after receiving the specimen sample.

Typically, for optical measurements, one or more optically detectable changes in the test chemistry are monitored, in order to derive the concentration of the at least one analyte to be detected from these changes. For detecting the at least one change of optical properties of the test chemistry, various types of detectors are known in the art. In recent developments, consumer-electronics such as mobile phones, laptops, smartphones and other portable devices have become popular to be used as detectors for detecting the changes in the test chemistry. Besides using consumer-electronics for detecting the changes of optical properties of the test chemistry in common test strips, acquiring information from specially designed test modules by using consumer-electronics, e.g. a camera of a portable device, are also known from the art. Thus, US 2017/0343480 A1 discloses a method for measuring blood glucose levels by a portable terminal using a strip module. The strip module includes a dye pad having a color that changes in response to a sample applied to the dye pad. The strip module also includes a transparent strip having a first side and a second side. The first side is opposite the second side. The dye pad is mounted on the first side of the transparent strip, and the transparent strip reflects light provided from a light source of a portable terminal located adjacent to the second side and transmits the light to the dye pad.

However, despite the advantages involved in using consumer-electronics for the purpose of measuring an analyte concentration in samples of bodily fluid, several technical challenges remain. Ambient light may contribute significantly to the light detected by a camera of the mobile device, such as a smartphone camera. Thus, the impact of ambient light on the determined analyte concentration generally needs to be considered which, so far, requires complex combinations of lighting arrangements, additional coupling means and specially designed test strips, such as for example known from US 2017/0343480 A1. In particular, the common approach of considering impact of ambient light by using additional hardware, generally leads to significant inconvenience for the user and an increase of the economic burden. Using consumer-electronics without such additional hardware would require additional information such as white area and other reference values in order to perform ambient light corrections. For determining this information the user may record at least one additional image which complicates handling for the user. In addition, an error rate is increased since the ambient light conditions such as angle of incidence, light color, brightness, have to be constant during taking recording of both images. In addition to ambient light, other effects such as light reflection, geometrical factors, and aging of the test element or components of the test element or the like may influence or falsify the measurement result. Furthermore, generally for optical measurements the sample is applied from above on top of a surface of the test element. For capturing an image of the test element the test element is deposited on its back surface. This may result in increased blood contamination on the deposited back surface.

Problem to be Solved

It is therefore desirable to provide devices and methods which address the above mentioned technical challenges of analytical measurements. Specifically, an optical test strip, a kit, computer program, mobile device and methods shall be provided which lessen the impact of ambient light and other factors such as light reflection, geometrical factors, aging or the like when determining or measuring an analyte concentration in a sample of bodily fluid, without requiring additional hardware.

SUMMARY

This problem is addressed by an optical test strip, a method for producing of a test strip, a kit, a computer program, a mobile device and a method for measuring an analyte concentration in a sample of bodily fluid with the features of the independent claims. Advantageous embodiments which might be realized in an isolated fashion or in any arbitrary combinations are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way. The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect, an optical test strip for measuring an analyte concentration in a sample of bodily fluid is disclosed. As used herein, the term "optical test strip" is a broad term and is to be given its ordinary and customary meaning to a person of ordinary skill in the art and is not to be limited to a special or customized meaning. The term specifically may, without limitation, refer to an arbitrary element configured for measuring an analyte concentration in a sample of bodily fluid. The optical test strip may particularly be configured for performing a color-change detection reaction and thereby providing optically detectable information on the analyte concentration. As an example, the optical test strip may particularly be strip shaped, thus, the test strip may have a long and narrow shape.

The term "analyte" as used herein is a broad term and is to be given its ordinary and customary meaning to a person of ordinary skill in the art and is not to be limited to a special or customized meaning. The term specifically may refer, without limitation, to one or more specific chemical compounds and/or other parameters to be detected and/or measured. As an example, the at least one analyte may be a chemical compound which takes part in metabolism, such as one or more of glucose, cholesterol or triglycerides. Additionally or alternatively, other types of analytes or parameters may be determined, e.g. a pH value.

The term "measuring an analyte concentration in a sample" as used herein is a broad term and is to be given its ordinary and customary meaning to a person of ordinary skill in the art and is not to be limited to a special or customized meaning. The term specifically may refer, without limitation, to a quantitatively and/or qualitatively determination of at least one analyte in an arbitrary sample. For example, the sample may comprise a body fluid, such as blood, interstitial fluid, urine, saliva or other types of body fluids. The result of the measurement, as an example, may be a concentration of the analyte and/or the presence or absence of the analyte to be measured. Specifically, as an example, the measurement may be a blood glucose measurement, thus the result of the measurement may for example be a blood glucose concentration.

The test strip comprises:
a) a bottom layer having a first end;
b) a top layer having a first end essentially aligned with the first end of the bottom layer;
c) at least one spacer layer interposed between the bottom layer and the top layer, the spacer layer having a length shorter than the bottom layer and shorter than the top layer such that the top layer and the bottom layer protrude over the spacer layer, wherein the first end of the bottom layer, the first end of the top layer, and the spacer layer form a sample receiving area which at least partially has capillary properties for receiving the sample of bodily fluid; and
d) at least one test field, wherein the test field comprises a test chemical being configured for performing an optically detectable detection reaction with the analyte, wherein the test field comprises at least one first region and at least one second region, wherein the first region faces the sample receiving area, wherein the first region is configured to be at least partly wetted by the sample of bodily fluid upon sample application, wherein the second region is covered by the spacer layer such that the second region is essentially inaccessible for the sample of bodily fluid.

The test strip may comprise a layer setup. The test strip may have a layered test strip architecture. As used herein, the term "layer setup" refers to a setup comprising at least two layers. The test strip may have a top side and a bottom side. The top side may be the side from which the test field is accessible for image capturing. As used herein, the term "bottom layer" refers to at least one layer of the test strip arranged at the bottom side of the test strip, e.g. an undermost layer of the test strip. The bottom layer may be or may comprise a test strip carrier. The term "test strip carrier" as used herein is a broad term and is to be given its ordinary and customary meaning to a person of ordinary skill in the art and is not to be limited to a special or customized meaning. The term specifically may refer, without limitation, to an arbitrary substrate configured to provide stabilizing means to the optical test strip, specifically to the test field. The bottom layer specifically may have a strip-shape, e.g. a shape of a rectangular strip. The bottom layer, as an example, may be flexible and/or deformable. The bottom layer, as an example, may have a width, e.g. a lateral extension perpendicular to a longitudinal axis of the test strip, of 1 mm to 20 mm, e.g. 2 mm to 5 mm. The bottom layer further may have a length, e.g. a longitudinal extension of 10 mm to 70 mm, e.g. 15 mm to 50 mm. The length may exceed the width by e.g. a factor of at least 1.5. The bottom layer further may have a thickness of 100 micrometers to 2 mm, e.g. 500 micrometers to 1 mm. The bottom layer may fully or partially be made of at least one material such as one or more of a plastic material, a ceramic material or a paper. The bottom layer may comprise Polyesters (e.g. Polyethylene terephthalate (PET)), Polymethacrylates (e.g. PMMA) Polyolefines (e.g. Polyethylene, Polypropylene), Polycarbonates, Polyamides, Cellulose or derivatives thereof (e.g. Cellophane®), Polyvinylchloride, Polystyrene, or combinations thereof. The bottom layer may comprise at least one bottom foil. Specifically, the bottom layer may fully or partially be made of at least one plastic foil. The bottom layer may be made of a single layer or of a plurality of layers. The bottom layer specifically, the bottom foil, may be opaque, such as by comprising at least one material which is fully or partially intransparent for visible light. The bottom layer may be uniform and/or homogenous, specifically uniform and/or homogenous in color and/or reflective properties and/or other surface properties. The bottom layer may be configured to provide a homogenous and white background for the test field. Thus, a background of the test field may be identical and less dependent on changes in brightness in the background. Specifically, the background of the test field may be independent from backlight illumination.

As used herein the term "top layer" refers to a layer of the test strip confining the layer setup of the test strip at the top side of the test strip. The top layer may comprise at least one top foil. The top foil may be transparent, specifically fully or partially transparent for visible light. For example, the top foil may be fully transparent. The top foil may have low reflective and/or specular properties. The top foil may be anti-reflective and/or may comprise at least one anti-reflective coating. The top foil may be configured to minimize reflections in case of illumination with high brightness. The top foil may be configured to reduce errors and/or artefacts due to reflection effects caused e.g. by flashlight of a camera and/or bright sunlight.

The top foil may comprise at least one material selected from the group consisting of: Polyesters (e.g. Polyethylene terephthalate (PET)), Polymethacrylates (e.g. PMMA) Polyolefines (e.g. Polyethylene, Polypropylene), Polycarbonates, Polyamides, Cellulose or derivatives thereof (e.g. Cellophane®), Polyvinylchloride, Polystyrene, or combinations thereof, or flexible glass e.g. ultra-thin glass such as glass foils. The top layer may be mechanical stable to avoid bending of the test strip and/or to provide protection to other components of the test strip. As the bottom layer, the top layer may specifically have a strip-shape, e.g. a shape of a rectangular strip.

The test strip may have a proximal and a distal end. The proximal end may be located at a sample application side of the test strip, wherein the distal end may be located at an opposite side of the test strip. As used herein, the term "first end" of the top layer refers to an end of the top layer located at or in proximity to the proximal end of the test strip. As used herein, the term "first end" of the bottom layer refers to an end of the bottom layer located at or in proximity to the proximal end of the test strip. The terms "first" and "second" are used within the application as names and give no information if further elements are present or about an order of the elements. The term "essentially aligned" refers to embodiment wherein the shapes and/or edges of the top layer and the bottom layer are identical wherein deviations from a completely aligned design are possible. The first end of the top layer may be aligned with the first end of the bottom layer. The first end of the top layer and the first end of the bottom layer may be aligned to form upper and lower walls of the sample receiving area, specifically of a capillary element. The bottom layer and the top layer may have an identical and/or aligned shape. The bottom layer and the top layer may have different length. For example, the length of the bottom layer may extend beyond the length of the top layer. Thus, the bottom layer may protrude over the top layer at the proximal end of the test strip. For example, the length of the top layer may extend beyond the length bottom layer. Thus, the top layer may protrude over the bottom layer at the proximal end of the test strip. The top and bottom layer having different length may allow enhanced handling, specifically facilitates sample application, and faster sample collection.

The top layer may have a second end, wherein the second end is an end opposite to the first end of the top layer. The bottom layer may have a second end, wherein the second end is an end opposite to the first end of the bottom layer. The second end of the top layer may be aligned with the second end of the bottom layer such that the distal end of the test strip may have an essentially flat edge which is formed by the second end of the top layer and the second end of the bottom layer. As used herein, the term "essentially flat" as used herein is a broad term and is to be given its ordinary and customary meaning to a person of ordinary skill in the art and is not to be limited to a special or customized meaning. The term specifically may refer, without limitation, to flat configurations wherein deviations from flat configurations of less than 5%, preferably of less than 2%, most preferably of less than 1% are possible. Other embodiments are feasible, such as embodiments wherein the test element comprises at least one holder, such as the bottom layer may protrude over the other layers of the layer setup, at the distal end.

As outlined above, the test strip comprises at least one spacer layer interposed between the bottom layer and the top layer. As used herein, the term "spacer layer" refers to at least one layer configured for separating the top layer and the bottom layer. The spacer layer may comprise Polyesters (e.g. Polyethylene terephthalate (PET)), Polymethacrylates (e.g. PMMA) Polyolefines (e.g. Polyethylene, Polypropylene), Polycarbonates, Polyamides, Cellulose or derivatives thereof (e.g. Cellophane®), Polyvinylchloride, Polystyrene, or combinations thereof.

The spacer layer has a length shorter than the bottom layer and shorter than the top layer such that the top layer and the bottom layer protrude over the spacer layer. As used herein, the term "length" of the respective layer refers to an extension of the respective layer along the longitudinal axis of the test strip, i.e. an elongated extension of the test strip. Specifically, the spacer layer may not extend up to an outer edge of the first end of the bottom layer nor to an outer edge of the first end of the top layer. The first end of the bottom layer, the first end of the top layer, and the spacer layer form a sample receiving area which at least partially has capillary properties for receiving the sample of bodily fluid. As used herein, the term "sample receiving area" generally refers to an arbitrary shaped area configured to provide an area to which the sample can be applied, e.g. a dosing position, and to receive the sample of bodily fluid upon sample application. The optical test strip may comprise at least one capillary element. As used herein, the term "capillary element" refers to an element which is adapted to receive the sample of the body fluid and/or transport the sample of the body fluid by capillary forces. The capillary element may comprise at least one volume configured to receive the sample of the body fluid, e.g. one or more capillary caps and/or one or more capillary slots and/or one or more capillary tubes having an arbitrary cross-section, such as a rectangular cross-section and/or a rounded cross-section and/or a polygonal cross-section. The capillary element may be formed by a gap between the top layer and the bottom layer bordered by an edge of the spacer layer. A height of the capillary element may be defined by a thickness of the spacer layer. As used herein, the term "thickness" of the spacer layer refers to an extension of the spacer layer along a height of the layer setup of the test strip. The thickness of the spacer layer may be selected such that the capillary element is high enough to allow rapid receiving of the sample even in case of high hematocrit values. The thickness of the spacer layer may be selected such that a small sample volume can be ensured. For example, the thickness of the spacer layer may be from 70 micrometers to 200 micrometers, preferably from 90 micrometers to 130 micrometers. The spacer layer and/or a surface of the top foil facing the spacer layer may comprise at least one adhesive coating, specifically a DURO-TAK® (Henkel) coating, comprising an Acrylate-Vinylacetate copolymer. Other adhesive coatings reagents are however possible.

The capillary element may be open at three sides. As outlined above, the spacer layer has a length shorter than the bottom layer and shorter than the top layer such that the top layer and the bottom layer protrude over the spacer layer. The sample receiving area may be a full-width end dose application area. As used herein, the term "full-width end dose application area" refers to a configuration of the sample receiving area to be configured to receive the sample of bodily fluid over the full-width of the test strip. The test strip may be configured such that the sample of the body fluid may be applicable to a side dose position and/or to a front dose position. As used herein, the term "side dose position" refers to a position on an elongated edge of the test strip where the sample of the body fluid is applicable, e.g. the test strip may comprise at least two opposing openings at edges of the test strip. Specifically, as outlined above, the capillary element may be open at three sides, e.g. a front side at the proximal of the test strip and at two opposing sides extending along a length of the capillary element. The test strip may comprise a side dose position at each of the opposing sides of the capillary element. A side dose position may be an ideal application position for capillary blood from a finger stick. As used herein, the term "front dose position" refers to a position at a front face of the test strip, wherein the term "front face" refers to a front surface area of a width of the test strip. For example, the front dose position may be an open side at the front face, i.e. at a front side at the proximal end of the test strip. Using a test strip having a capillary element which can receive the sample at three sides of the test strip at the proximal end of the test strip is, specifically, advantageous under hygienic aspects and cleaning and disinfection requirements, specifically reduces blood contaminations in case of depositing the test strip for capturing at least one image of the test field. In addition, using the capillary element may ensure that the test strip receives only as much of the sample of bodily fluid as needed and as much of the sample which can be stored within the test strip.

The capillary element may be configured for transporting the sample of bodily fluid from one or more of the dosing positions to the test field, in particular to the first region of the test field. At least one inner surface of the capillary element may be coated with a hydrophilic coating, specifically comprising an anionic, high-molecular Polyurethane-dispersion such as a Dispercoll® (Covestro) coating. Other hydrophilisation reagents are however possible. This may ensure proper receiving and transport of the capillary element even after storage times.

The term "test field" as used herein is a broad term and is to be given its ordinary and customary meaning to a person of ordinary skill in the art and is not to be limited to a special or customized meaning. The term specifically may refer, without limitation, to an arbitrary element having at least one amount of a test chemical for detecting at least one analyte. The test field, as an example, may comprise at least one layer comprising the test chemical. As an example, the test field may comprise an arbitrary layered element, having a layered structure, with the test chemical being comprised by at least one layer of the layered structure. Particularly, the term may refer to a coherent amount of the test chemical, such as to a field, e.g. a field of round, polygonal or rectangular shape, having one or more layers of material, with at least one layer of the test field having the test chemical applied thereto.

The test field may comprise at least one carrier foil carrying the test chemical. However, embodiments may be possible without a carrier foil in which the test chemical may be applied directly to the top foil. The at least one carrier foil of the test field may be applied to the top layer. The test field may be adhered to the top layer by at least one transparent adhesive layer, such as a transparent adhesive layer comprising an adhesive, specifically a DURO-TAK® (Henkel) adhesive, comprising an Acrylate-Vinylacetate copolymer. Specifically, the carrier foil may be or may comprise a material having an inherent rigidity. The term "carrier foil" as used herein is a broad term and is to be given its ordinary and customary meaning to a person of ordinary skill in the art and is not to be limited to a special or customized meaning. The term specifically may refer, without limitation, to an arbitrary film like material. Specifically, the carrier foil may have a foil shape. For example, the carrier foil may have a width which corresponds to a width of the test strip, e.g. of around 5 mm. The carrier foil may have a length such that, in an assembled state of the test strip, the carrier foil covers a length of the capillary element partly. For example, the length of the carrier foil may be around 5 mm, wherein the carrier foil may be arranged such that around 2.5 mm of the length of the capillary element may be covered and around 2.5 mm may be uncovered. The carrier foil may have a thickness, wherein the thickness may be at least ten times smaller than the length of the carrier foil. The carrier foil specifically may be made of at least one flexible or deformable material, such as at least one flexible or deformable plastic foil. The plastic foil, as an example, may have a thickness of 10 micrometers to 500 micrometers. The carrier foil, specifically, may comprise at least one transparent matrix material, such as at least one transparent plastic material being translucent in the visible spectral range. In particular, the carrier foil may comprise a complex structure, for example a layered structure having one or more layers of material. Thus, the carrier foil may specifically comprise the at least one layer of transparent matrix material. Other layers may be present, for example adhesive layers, such as glue layers or other layers for bonding.

The test field further may comprise at least one test chemical directly or indirectly applied to the carrier foil. The test chemical is configured for performing an optically detectable detection reaction with the analyte. The term "test chemical" as used herein is a broad term and is to be given its ordinary and customary meaning to a person of ordinary skill in the art and is not to be limited to a special or customized meaning. The term specifically may refer, without limitation, to a chemical compound or a plurality of chemical compounds such as a mixture of chemical compounds suited for performing a detection reaction in the presence of the analyte, wherein the detection reaction is detectable by specific means, such as optically. The detection reaction specifically may be analyte-specific. The test chemical, in the present case, specifically may be an optical test chemical, such as a color-change test chemical which changes in color in the presence of the analyte. The color change specifically may depend on the amount of analyte present in the sample. The test chemical, as an example, may comprise at least one enzyme, such as glucose oxidase and/or glucose dehydrogenase. Additionally, other components may be present, such as one or more dyes, mediators and the like. Test chemicals are generally known to the skilled person and reference may be made to J. 20 Hönes et al.: Diabetes Technology and Therapeutics, Vol. 10, Supplement 1, 2008, pp. 10-26. Other test chemicals, however, are feasible, too.

As used herein, the terms "first region" and "second region" of the test field refer to arbitrary shaped regions of the test field. The test field may comprise exactly one first region and one second region. However, configurations are feasible wherein the test field may comprise a plurality of first and second regions. The first region faces the sample receiving area. As used herein, the term "faces the sample receiving area" may refer to the fact that the first region is in contact with the sample receiving area, specifically with the capillary element, in order to receive the sample of bodily fluid upon application. The first region is configured to be at least partly wetted by the sample of bodily fluid upon sample application. As used herein, the term "is wetted" refers to the process of receiving the sample of bodily fluid. As used herein, the term "is at last partly wetted" refers to configurations in which the first region is fully or completely wetted and to configurations in which the first region is only partly wetted. The first region may be located in close proximity to the proximal end of the test strip. This may allow using a short capillary element. The second region is covered by the spacer layer such that the second region is essentially inaccessible for the sample of bodily fluid. As used herein, the term "is essentially inaccessible" for the sample of bodily fluid refers to that the second region essentially is not wetted upon sample application. As used herein, the terms "essentially inaccessible" and "essentially not wetted" refer to configurations in which the second region completely is inaccessible for the sample of bodily fluid, wherein access of the sample into the second region are tolerable as long as no optically detectable reaction is performed. The first region and the second region of the test field may be located in close proximity, preferably adjacent to one another. Specifically, the first region and the second region may be arranged such that it may be possible to record one single image comprising the first region and the second region. The first region and the second region may be arranged successively along an elongated extension of the test strip.

The second region may be a dry blank field. An image of the dry blank field may be used as reference value for ambient light conditions such as angle of incidence, light color, brightness, or for other effects such as light reflection, geometrical factors, aging of the test strip or components of the test strip or the like. The first region and the second region may be arranged such that they can be imaged in a single image at the same time. This may ensure that ambient light conditions and other conditions are identical for both the imaged wetted first region and its reference image of the second region. By using a dry blank field integrated in the test strip, specifically in the test field, it may be possible to record a single image at the same time of the wetted test field region and a corresponding dry reference region. This may allow performing ambient light corrections and corrections for other effects within one image, and, thus, to enhance reliability of the measurement results. The test chemical of the test field may be used as reference color. In addition, further reference colors may be used. For example, as will be described in more detail below, a reference color field such as a white field may be used. Thus, it may be possible to gain additional color information for an image analysis and/or evaluation algorithm for analyzing the image of the test field for measuring the analyte concentration. Specifically, it may be possible to determine a reference image without recording additional images, e.g. before or after recording the image of the first region. Furthermore, correction for ambient light and other effects may be possible without additional tools such as additional hardware or color quality cards. Thus, it may be possible to omit color quality control which may allow reducing costs. Visibility of the dry blank field in the same image with the wetted test field may allow using optimized image analysis, specifically using neural networks such as Deep Learning.

The first region and the second region may have essentially the same spectral and/or spectroscopic characteristics and/or reflective and/or absorption properties. As used herein, the term "essentially" the same spectral and/or spectroscopic characteristics and/or reflective and/or absorption properties refers to configurations in which the first region and the second region have identical spectral and/or spectroscopic characteristics and/or reflective and/or absorption properties wherein deviations are tolerable as long as the spectral and/or spectroscopic characteristics and/or reflective and/or absorption properties are similar. For example, the first region and the second region may be formed by using the same test field, wherein e.g. one half of the test field is masked and the other half is non-masked. All properties of the first region and the second region in dry state are essentially identical and only vary with respect to batch inhomogeneities of the coating. After application of the sample, the second region may be a reference to the first region. This reference may exhibit the properties of the dry test field at identical light conditions. This may allow more precise and accurate corrections as compared to using reference fields such as printed reference colors since reference colors may exhibit different properties at different light conditions.

The image of the dry blank field may further be used for failsafe. The image of the dry blank field may be used to determine whether the color of the test field has changed such that no correct color change may be measurable upon sample application, e.g. in case the test strip was exposed to light for a certain time period. After taking the image an algorithm may check the color of the dry blank field after white balance and may compare it with the expected origin color. If a significant color change may be recognized which lies above a defined threshold, e.g. because light exposure has damaged sensitive chromophores or has initiated colored byproducts, an error notification may be issued in order to request a new test strip.

The test strip may comprise at least one supporting spacer which is arranged between the top layer and the spacer layer. As used herein, the term "supporting spacer" refers to an additional spacer layer. When assembling the top layer, spacer layer and test field a gap may occur in a longitudinal direction behind the test field in between the spacer layer and the top layer. The supporting spacer may be adapted to fill this gap at least partially, to enhance mechanical stability and also may simplify the process of printing e.g. a barcode. As used herein, the term "at least partially filling" refers to configurations in which the supporting spacer completely fills the gap and to configurations in which the supporting spacer has a thickness below the height of the gap.

The test strip may comprise at least one imprint. The imprint may comprise at least one element selected from the group consisting of: at least one barcode, at least one 2D-label, at least one 3D-label; at least one reference color, at least one thermochromic imprint or label configured for changing its color depending on temperature. The thermochromic imprint may be used for determining a temperature range which may be considered during image analysis. The imprint may comprise at least one information selected from the group consisting of: a batch or lot information, a code information, a safety identification information, spatial location. The imprint may be arranged on the spacer layer and/or the supporting spacer facing the top layer. The top layer may be designed as a protective layer.

The top layer may be configured for protecting the imprint and to prevent damages such as scratches of the imprint.

For example, the optical test strip may further comprise at least one additional reference color field. The term "reference color field" as used herein is a broad term and is to be given its ordinary and customary meaning to a person of ordinary skill in the art and is not to be limited to a special or customized meaning. The term specifically may refer, without limitation, to an arbitrary two-dimensional area which has a predetermined color of known properties. In particular, the reference color field may for example comprise at least one white field, such as a field having a white color. Further, the reference color field may have a shape which is selected from the group consisting of: a rectangular shape; a square shape; a round shape; a circular shape. In particular, the reference color field may for example be used as an additional reference. Specifically, when determining the analyte concentration within the sample applied to the test field, the color of the reference color field may be used as a reference to be compared to the optically detectable detection reaction of the test chemical with the analyte.

The test strip may comprise at least one wavelength filter component. The wavelength filter component may be selected from the group consisting of a longpass filter component and a bandpass filter component. The wavelength filter component may be located within the carrier foil, specifically the wavelength filter component may be dispersed within the carrier foil. The test strip may comprise at least one transparent adhesive layer. The wavelength filter component may be located within the transparent adhesive layer, specifically the wavelength filter component may be dispersed within the transparent adhesive layer.

The carrier foil may have the at least one wavelength filter component which is adapted to essentially block light having wavelengths $\lambda_{blc}$ of 400 nm≤$\lambda_{blc}$≤$WL_{low}$, with 550 nm≤$WL_{low}$≤650 nm. In particular, $WL_{low}$ refers to a wavelength characterizing the at least one wavelength filter component. The term "light" as used herein is a broad term and is to be given its ordinary and customary meaning to a person of ordinary skill in the art and is not to be limited to a special or customized meaning. The term specifically may refer, without limitation, to an electromagnetic radiation having wavelengths within an electromagnetic spectrum. Specifically, the term light as referred to hereinafter, may specifically be or may comprise electromagnetic radiation having wavelengths $\lambda_e$ at least in the range of 100 nm≤$\lambda_e$≤1200 nm, particularly 200 nm≤$\lambda_e$≤1200 nm, more particularly 400 nm≤$\lambda_e$≤1200 nm.

In particular, the wavelength filter component may for example be introduced into or mixed within a matrix material of the carrier foil, e.g. a transparent matrix material, of the carrier foil, specifically within at least one layer of the carrier foil. Additionally or alternatively, the wavelength filter component may be implemented into the matrix material by being one or more of dispersed in the matrix material or chemically bound to the matrix material, e.g. by covalent bond, chemical complexing or ion bonding. Additionally or alternatively, the wavelength filter component may also form at least one filter layer, e.g. at least one layer disposed on one or both sides of at least one layer of the matrix material.

The term "essentially block" as used herein is a broad term and is to be given its ordinary and customary meaning to a person of ordinary skill in the art and is not to be limited to a special or customized meaning. The term specifically may refer, without limitation, to a process of a majority of electromagnetic radiation being stopped or blocked from passing through matter. In particular, the wavelength filter component having the characterizing wavelength $WL_{low}$ and configured for essentially blocking light having wavelengths $\lambda_{blc}$, may specifically be configured for one or both of absorbing or reflecting ≥80% of the intensity of electromagnetic radiation having wavelengths $\lambda_{blc}$≤$W_{low}$, from transmitting or passing through the carrier foil. Thus, the wavelength filter component having the characterizing wavelength $WL_{low}$ and configured for essentially blocking light having wavelengths $\lambda_{blc}$, may specifically be configured for transmitting less than 20%, in particular less than 10%, more particular less than 5%, of light having wavelengths $\lambda_{blc}$≤$WL_{low}$ through the carrier foil. The transmission may specifically be defined as a quotient of an intensity of light, e.g. electromagnetic radiation, transmitted by the filter, divided by the starting intensity of the light incident on the filter, multiplied by 100%.

The blocking effect of the at least one wavelength filter component may be based on various physical principles. Thus, as an example, the wavelength filter component may comprise at least one filter material being suited for absorbing the light, specifically in a wavelength-selective fashion, such as at least one dye, e.g. at least one organic or inorganic dye. The filter material, e.g. the at least one dye, as an example, may be introduced in at least one matrix material, e.g. as outlined above. Additionally or alternatively, the filter material may also be comprised by at least one filter layer, e.g. at least one layer of the filter material being directly or indirectly applied onto one or both sides of the carrier foil. Further, in addition or as an alternative to an absorption, the blocking effect may be also achieved by a reflection, e.g. in a wavelength-selective fashion. Thus, as an example and as will be outlined in further detail below, the wavelength filter component may comprise at least one multi-layer setup comprising a plurality of layers having differing optical refractive indices. Thus, as an example, the wavelength filter component may comprise at least one interference filter, e.g. at least one interference filter having a plurality of layers of at least one organic or inorganic material, the layers having a varying refractive index, e.g. a periodically varying refractive index. The layer setup, as an example, may directly or indirectly be applied to the carrier foil on one or both sides. Additionally or alternatively, the carrier foil itself may be part of the wavelength-selective element. Combinations of the named possibilities are feasible.

The test chemical may further be configured for at least partially, for example fully or partially, absorbing light having at least one absorption wavelength $\lambda_{abs}$ in the range 650 nm <$\lambda_{abs}$≤1100 nm. In particular, light having the at least one absorption wavelength $\lambda_{abs}$ may in particular be fully or partially absorbed by the test chemical. The term "absorb" as used herein is a broad term and is to be given its ordinary and customary meaning to a person of ordinary skill in the art and is not to be limited to a special or customized meaning. The term specifically may refer, without limitation, to a process of energy being taken up by matter, such as the electrons of an atom. Thus, in particular, electromagnetic energy of light having the at least one absorption wavelength $\lambda_{abs}$ may be at least partially taken up by the test chemical and thereby for example be transformed into internal energy of the test chemical. Thus, as an example, the test chemical may specifically have an extinction or attenuation coefficient $\alpha$>0.

As an example, the wavelength filter component may be selected from the group consisting of a longpass filter component and a bandpass filter component. Specifically, the wavelength filter component may specifically be or may comprise a longpass filter, such as for example the wavelength filter component may be configured for essentially block light having wavelengths $\lambda_{blc}$≥$WL_{low}$. Alternatively, the wavelength filter component may be or may comprise a bandpass filter. The bandpass filter may specifically be or may comprise a combination of a longpass filter and a shortpass filter and may thus only transmit light within a predefined wavelength range, for example only within a wavelength band. Thus, in particular, the wavelength filter component may additionally be configured to block light having wavelengths $\lambda_{blc}$≥$WL_{high}$. Specifically, $WL_{high}$ may refer to an additional wavelength further characterizing the at least one wavelength filter component. As an example, the wavelength filter component may be configured to essentially block light for example having a wavelength of $WL_{high}$ and higher, as well as light having wavelengths $WL_{low}$ and lower.

In particular, the wavelength filter component may specifically be or may comprise at least one longpass filter. The longpass filter may particularly have a transmission edge rising with the wavelength of the light. Thus, the longpass filter may specifically show a higher transmission of light, the higher the wavelength. In particular, the transmission of light through the longpass filter may rise with rising wavelength. Further, the longpass filter may have a characterizing wavelength $\lambda_{LP}$. Thus, $WL_{low}$ may equal $\lambda_{LP}$. In particular, a transmission $T_{LP}$ of the longpass filter at $\lambda_{LP}$ may be 50% of a maximum transmission $T_{LPmax}$ of the longpass filter. Thus, the characterizing wavelength $\lambda_{LP}$ may be defined such that a transmission $T_{LP}$ of the longpass filter at $\lambda_{LP}$ may be 50% of the maximum transmission $T_{LPmax}$ of the longpass filter. In particular, as an example, if the longpass filter, for example in its transmission range, has a maximum transmission of 85%, the characteristic wavelength $\lambda_{LP}$ for this case is defined as that wavelength at which the longpass filter attains a transmission of 0.5×85%=42.5%, for example when viewing the transmission spectrum with rising wavelengths. In particular, the maximum transmission of the longpass filter may for example be at least 75%, specifically at least 80%, more specifically at least 85% or even at least 90% or at least 95%.

Further, the longpass filter may have a steepness $S_{LP}$ of the rising transmission edge. In particular, it may be preferred when the longpass filter has a steep transmission edge in order to block or absorb a maximum part of light having wavelengths below $\lambda_{LP}$ and a maximum part of light having wavelengths over or above $\lambda_{LP}$. The steepness of the longpass filter may generally be reported in the unit electron volts (eV) and may be defined as $$S_{LP}=h \cdot c \cdot [(1/\lambda_{blc})-(1/\lambda_{trans})]. \quad (1)$$

In Equation (1), $\lambda_{blc}$ may specifically be that wavelength at and below which the longpass filter essentially blocks light. Thus, at wavelength $\lambda_{blc}$ the Transmission $T_{LP}$ of the longpass filter may specifically be smaller than 20%, in particular smaller than 10%, more particular smaller than 5%. Further, $\lambda_{trans}$ may be defined as being that wavelength at and above which the longpass filter attains a value of 95% of the maximum transmission $T_{LPmax}$ of the longpass filter. Thus, at wavelengths smaller than $\lambda_{trans}$ the transmission $T_{LP}$ of the longpass filter may be <95% of the maximum transmission $T_{LPmax}$ of the longpass filter and at wavelengths equal or greater than $\lambda_{trans}$ the transmission $T_{LP}$ may be ≥95% of $T_{LPmax}$, for example 95% to 100% of $T_{LPmax}$. If, for example, the longpass filter, more particularly in a transmission region, has a maximum transmission of 85%, $\lambda_{trans}$ may be defined as that wavelength at which, for example with rising wavelength, the transmission attains a value of 0.95×85%=80.75%. In addition, the above mentioned formula for the steepness of the longpass filter, the parameter h denotes Planck's constant (h~6.626·10$^{-34}$ Js) and c the speed of light in a vacuum (c~3.0·10$^8$ m/s). With steepness defined in such a way, specifically, the steepness $S_{LP}$ may for example be 0 eV<$S_{LP}$≤1.2 eV, specifically 0.1 eV≤$S_{LP}$≤1.1 eV, more specifically 0.2 eV≤$S_{LP}$≤0.9 eV.

In particular, the characterizing wavelength $WL_{low}$ characterizing the at least one wavelength filter component, may for example be in the range of 550 nm≤$WL_{low}$≤650 nm, specifically in the range of 600 nm≤$WL_{low}$≤650 nm, more specifically in the range of 625 nm≤$WL_{low}$≤650 nm.

The test field of the optical test strip may particularly have a shape selected from the group consisting of: a rectangular shape; a square shape; a round shape; a circular shape. Further, the test field may comprise at least one spreading layer. In particular, the spreading layer may be configured to equally spread or distribute the sample of bodily fluid over a surface of the test field on which the sample may be applied.

The wavelength filter component may for example comprise an interference filter, specifically a high-pass interference filter. The term "interference filter" as used herein is a broad term and is to be given its ordinary and customary meaning to a person of ordinary skill in the art and is not to be limited to a special or customized meaning. The term specifically may refer, without limitation, to an optical filter that reflects one or more spectral bands or lines and transmits others, while maintaining a nearly zero coefficient of absorption for all wavelengths of interest. As an example, the interference filter may comprise multiple layers of dielectric material having different refractive indices. In particular, the interference filter comprises wavelength selective properties. Thus, as an example, the high-pass interference filter having a characteristic wavelength $\lambda_{HPF}$ also referred to as cut-off frequency, may selectively block or attenuate all light having wavelengths below $\lambda_{HPF}$, wherein the high-pass interference filter may transmit all light having wavelengths higher than $\lambda_{HPF}$.

The interference filter may specifically be located on at least one surface of the carrier foil. As an example, the interference filter may be directly or indirectly applied to an upper surface of the carrier foil, for example as a separate layer. Additionally or alternatively, the interference filter may be directly or indirectly applied to a lower surface of the carrier foil.

Thus, the interference filter may for example be located on both the upper and the lower surface of the carrier foil.

Further, the optical test strip, specifically the carrier foil, may comprise at least one further filter component. In particular, the at least one further filter component may comprise a shortpass filter. Specifically, the shortpass filter may have a transmission edge falling with the wavelength of the light. Thus, the shortpass filter may specifically show an increasing transmission of light for decreasing wavelengths. In particular, the transmission of light through the shortpass filter may fall with rising wavelength. Further, the shortpass filter may have a characteristic wavelength $\lambda_{SP}$, wherein $\lambda_{SP}$ may equal $WL_{high}$. In particular, a transmission $T_{SP}$ of the shortpass filter at $\lambda_{SP}$ may be 50% of a maximum transmission $T_{SPmax}$ of the shortpass filter. For example, the characteristic wavelength $\lambda_{SP}$ of the shortpass filter may be in the range of 630 nm≤$\lambda_{SP}$≤800 nm, specifically in the range of 640 nm≤$\lambda_{SP}$≤680 nm.

As an example, the further filter component, specifically the shortpass filter, may be or may comprise a short-pass interference filter. Specifically, the short-pass interference filter may for example be an interference filter as defined above. In particular, the short-pass interference filter may comprise multiple layers of dielectric material having different refractive indices. In particular, the short-pass interference filter may also comprise wavelength selective properties. Thus, as an example, the short-pass interference filter may have a characteristic wavelength $\lambda_{SPF}$ and may selectively block or attenuate all light having wavelengths higher than $\lambda_{SPF}$, wherein the short-pass interference filter may transmit all light having wavelengths lower than $\lambda_{SPF}$.

The optical test strip, specifically the carrier foil, may for example comprise a combination of filter components. As an example, the optical test strip may comprise a combination of a longpass filter and a shortpass filter, e.g. a high-pass interference filter and a short-pass interference filter. However, other combinations of filters are feasible.

In particular, the further filter component may be configured for essentially blocking transmission of light having wavelengths $\lambda \geq WL_{high}$, with $WL_{high} > WL_{low}$, specifically $WL_{high} \geq WL_{low} + 20$ nm, more specifically $WL_{high} \geq WL_{low} + 30$ nm, e.g. $WL_{low} + 20$ nm $\leq WL_{high} \leq WL_{low} + 60$ nm, e.g. $WL_{low} + 30$ nm $\leq WL_{high} \leq WL_{low} + 50$ nm.

In particular, the carrier foil may for example comprise at least one material selected from the group consisting of: a thermoplastic material; a Polyethylene terephthalate (PET); a polycarbonate, specifically Pokalon®. Further, as an example, the test strip carrier may comprise at least one material selected from the group consisting of: a plastic material; a thermoplastic material; a polycarbonate, specifically Makrolon® or Lexan®.

In a further aspect of the invention, a method for producing an optical test strip according the present invention as described in one or more of the preceding embodiments above or as further described below is disclosed. The method comprises the following method steps, which may be performed in the given order. However, a different order may also be possible. Further, one, more than one or even all of the method steps may be performed once or repeatedly. Further, the method steps may be performed successively or, alternatively, two or more method steps may be performed in a timely overlapping fashion or even in parallel. The method may further comprise additional method steps which are not listed.

The method comprises the following steps:
i) providing a top layer;
ii) providing at least one test field, wherein the test field comprises a test chemical being configured for performing an optically detectable detection reaction with the analyte, wherein the test field comprises at least one first region and at least one second region;
iii) attaching the test field to the top layer;
iv) providing at least one spacer layer and arranging the spacer layer such that the first region remains uncovered by the spacer layer and the second region is covered by the spacer layer such that the second region is essentially inaccessible for the sample of bodily fluid;
v) providing a bottom layer having a first end, aligning the first end of the bottom layer with a first end of the top layer and attaching the bottom layer to the spacer layer such that the spacer layer is interposed between the bottom layer and the top layer, the spacer layer having a length shorter than the bottom layer and shorter than the top layer such that the top layer and the bottom layer protrude over the spacer layer, wherein the first end of the bottom layer, the first end of the top layer, and the spacer layer form a sample receiving area which at least partially has capillary properties for receiving the sample of bodily fluid, wherein the first region faces the sample receiving area.

For further possible definitions of terms and possible embodiments of the test strip, reference may be made to the description of the optical test strip given above or as further described below.

The layers of the layer setup of the test strip may be laminated using conventional laminating machines and can be produced in a cold and simple process. In step iii) the test field may be attached to the top layer using at least one transparent adhesive layer. For example, subsequently, one half of the test field may be covered by adhering the spacer layer thereto, thereby forming upper wall and side wall of the capillary element. The test field, the adhesive layer and the top layer may be arranged such that in the layer setup the first region and the second region of the test field are arranged below the top layer and the adhesive layer. This arrangement may ensure that influences of top layer and adhesive layer are identical for both the first and the second region. Thus, in case of using a quotient, as will be described below, for determining the analyte concentration, these influences can be neglected during analysis. Specifically, subsequently after laminating the top layer, the test field and the spacer layer, the bottom layer may be adhered to the spacer layer by using at least one further adhesive layer to the spacer layer thereby forming the capillary element. The further adhesive layer may be provided by coating a side of the spacer layer facing in an assembled state of the test strip the bottom layer with at least one adhesive coating, specifically a DURO-TAK® coating. The bottom layer may be further coated with a hydrophilic coating, specifically a Dispercoll® coating. Other hydrophilisation reagents are however possible as long as adherence with the further adhesive layer is ensured. This may ensure that the capillary element may be configured to receive the sample of bodily fluid rapidly even after storage time periods.

Further, step iv) may comprise arranging at least one supporting spacer between the top layer and the spacer layer. The supporting spacer may be attached to the top layer using at least one transparent adhesive layer.

The method may further comprise placing at least one imprint on the test strip, e.g. by using at least one suitable printing technique. The imprint may comprise at least one element selected from the group consisting of: at least one barcode, at least one 2D-label, at least one 3D-label; at least one reference color, at least one thermochromic imprint or label configured for changing its color depending on temperature, wherein the imprint is placed on the spacer layer and/or the supporting spacer facing the top layer, wherein the placing of the imprint is performed before attaching the spacer layer and/or the supporting spacer to the top layer.

In a further aspect of the invention, a method for measuring an analyte concentration in a sample of bodily fluid applied to a test field of an optical test strip by using a mobile device is disclosed. The method comprises the following method steps, which may be performed in the given order. However, a different order may also be possible. Further, one, more than one or even all of the method steps may be performed once or repeatedly. Further, the method steps may be performed successively or, alternatively, two or more method steps may be performed in a timely overlapping fashion or even in parallel. The method may further comprise additional method steps which are not listed.

The method comprises the following steps:
I. providing an optical test strip having at least one spacer layer interposed between a bottom layer and a top layer, the optical test strip comprising at least one test field, wherein the test field comprises a test chemical being configured for performing an optically detectable detection reaction with the analyte, wherein the test field comprises at least one first region and at least one second region, wherein the first region is configured to be at least partly wetted by the sample of bodily fluid upon sample application, wherein the second region is covered by the spacer layer such that the second region is essentially inaccessible for the sample of bodily fluid;

II. providing the mobile device, wherein the mobile device comprises at least one camera,
III. applying the sample of bodily fluid to the test field;
IV. capturing at least one image of the first region and second region of the test field by using the camera of the mobile device;
V. determining a reference value of the second region of the test field by evaluating at least one reference region of the captured image corresponding to the second region;
VI. determining a measurement value by evaluating at least one measurement region of the captured image corresponding to the first region of the test field; and
VII. determining the analyte concentration of the sample of the bodily fluid using the measurement value and the reference value.

In the method at least one optical test strip according to the present invention may be used. For further possible definitions of terms and possible embodiments, reference may be made to the description of the optical test strip and method for producing the test strip given above or as further described below.

The term "mobile device" as used herein is a broad term and is to be given its ordinary and customary meaning to a person of ordinary skill in the art and is not to be limited to a special or customized meaning. The term specifically may refer, without limitation, to a mobile electronics device, more specifically to a mobile communication device such as a cell phone or smart phone. Additionally or alternatively, the mobile device may also refer to a tablet computer or another type of portable computer having at least one camera.

The term "camera" as used herein is a broad term and is to be given its ordinary and customary meaning to a person of ordinary skill in the art and is not to be limited to a special or customized meaning. The term specifically may refer, without limitation, to a device having at least one imaging element configured for recording or capturing spatially resolved one-dimensional, a two-dimensional or even three-dimensional optical information. As an example, the camera may comprise at least one camera chip, such as at least one CCD chip and/or at least one CMOS chip configured for recording images. As used herein, without limitation, the term "image" specifically may relate to data recorded by using a camera, such as a plurality of electronic readings from the imaging device, such as the pixels of the camera chip. The image itself, thus, may comprise pixels, the pixels of the image correlating to pixels of the camera chip.

The camera specifically may be a color camera. Thus, e.g. for each pixel, color information may be provided or generated, such as color values for three colors R, G, B. A larger number of color values is also feasible, such as four colors for each pixel. Color cameras are generally known to the skilled person. Thus, as an example, each pixel of the camera chip may have three or more different color sensors, such as color recording pixels like one pixel for red (R), one pixel for yellow (G) and one pixel for blue (B). For each of the pixels, such as for R, G, B, values may be recorded by the pixels, such as digital values in the range of 0 to 255, depending on the intensity of the respective color. Instead of using color triples such as R, G, B, as an example, quadruples may be used, such as C, M, Y, K. These techniques are generally known to the skilled person.

The mobile device may further comprise at least one illumination source. The illumination source may specifically be configured for emitting light for the purpose of illuminating an object when taking an image thereof using the mobile device. In particular, the method step IV) may further comprise illuminating the optical test strip, specifically the test field, in particular by using the illumination source of the mobile device.

As used herein, the term "reference value of the second region" refers to a color value of the second region. As used herein, the term "reference region" refers to at least one region of interest of the captured image suitable for determining the reference value. The region of interest may fulfill at least one condition such as maximal homogenous background and/or maximal homogenous color distribution and/or minimum reflections. Method steps IV) to VII) may be performed by at least one processor of the mobile device. The processor may be adapted to perform at least one image analysis algorithm for selecting the reference region and for evaluating the reference value. As used herein, the term "measurement value" refers to a color value of the first region. As used herein, the term "measurement region" refers to a region of interest in the captured image suitable for determining the measurement value. The region of interest may fulfill at least one condition such as maximal homogenous wetting and/or minimum reflections. The processor may be adapted to perform at least one image analysis algorithm for selecting the measurement region and for evaluating the measurement value.

The mobile device, specifically the processor, may be configured for determining the analyte concentration of the sample of the bodily fluid using the measurement value and the reference value. The processor may be configured for performing at least one evaluation algorithm for evaluating the color value of the measurement region. The evaluation algorithm may comprise a plurality of input parameters which may be considered during performing the evaluation algorithm. The input parameter may be at least one parameter selected from the group consisting of: the reference value of the second region of the test field, a temperature range which may be determined by using thermocromic imprints, further color reference values such as of at least one further reference color field, additional information about aging, batch and the like determined, for example, by reading information from an imprint of the test strip. The performing of the evaluation algorithm may comprise using at least one neural network. The evaluation algorithm may comprise at least one failsafe, wherein outlier are detected and examined. The analyte concentration BG of the sample of the bodily fluid may be determined from a quotient of the measurement value MV and the reference value RV, specifically by BG MV/RV.

The mobile device may further comprise a wavelength filter. The wavelength filter may be integrated into the camera chip, for example into at least one CMOS chip.

In a further aspect a computer program comprising program means for fully or partially performing the method for measuring an analyte concentration in a sample of bodily fluid is disclosed. Thus, specifically, step V) to step VII) of the method may be performed by the computer program. In particular, the computer program comprises program means, such as computer executable instructions for fully or partially performing the method for measuring an analyte concentration in a sample of bodily fluid while the computer program is being executed on a computer or on a computer network, such as for example on a processor of the mobile device. Specifically, the computer may fully or partially be integrated into the mobile device, and the computer program specifically may be embodied as a software app. In particular, the computer program may be stored on a computer-readable data carrier, such as for example on a memory or data storage of the mobile device. Alternatively however, at least part of the computer may also be located outside of the mobile device.

Further disclosed and proposed herein is a data carrier having a data structure stored thereon, which, after loading into a computer or computer network, such as into a working memory or main memory of the computer or computer network, may execute the method for measuring an analyte concentration in a sample of bodily fluid according to one or more of the embodiments disclosed herein, e.g. steps V) to VII), including possible substeps.

Further disclosed and proposed herein is a computer program product with program code means stored on a machine-readable carrier, in order to perform the method for measuring an analyte concentration in a sample of bodily fluid according to one or more of the embodiments disclosed herein, when the program is executed on a computer or computer network, e.g. steps V to VII), including possible substeps. As used herein, a computer program product refers to the program as a tradable product. The product may generally exist in an arbitrary format, such as in a paper format, or on a computer-readable data carrier. Specifically, the computer program product may be distributed over a data network.

Finally, disclosed and proposed herein is a modulated data signal which contains instructions readable by a computer system or computer network, for performing the method for measuring an analyte concentration in a sample of bodily fluid according to one or more of the embodiments disclosed herein, specifically one or more steps of the method for measuring an analyte concentration in a sample of bodily fluid as mentioned above or as further described below, e.g. steps V) to VII), including possible substeps.

Specifically, further disclosed herein are:
- a computer or computer network comprising at least one processor, wherein the processor is adapted to perform the method for measuring an analyte concentration in a sample of bodily fluid according to one of the embodiments described in this description, e.g. steps V) to VII), including possible substeps,
- a computer loadable data structure that is adapted to perform the method for measuring an analyte concentration in a sample of bodily fluid according to one of the embodiments described in this description while the data structure is being executed on a computer, e.g. steps V) to VII), including possible substeps,
- a computer program, wherein the computer program is adapted to perform the method for measuring an analyte concentration in a sample of bodily fluid according to one of the embodiments described in this description while the program is being executed on a computer, e.g. steps V) to VII), including possible substeps,
- a computer program comprising program means for performing the method for measuring an analyte concentration in a sample of bodily fluid according to one of the embodiments described in this description while the computer program is being executed on a computer or on a computer network, e.g. steps V) to VII), including possible substeps,
- a computer program comprising program means according to the preceding embodiment, wherein the program means are stored on a storage medium readable to a computer,
- a storage medium, wherein a data structure is stored on the storage medium and wherein the data structure is adapted to perform the method for measuring an analyte concentration in a sample of bodily fluid according to one of the embodiments described in this description after having been loaded into a main and/or working storage of a computer or of a computer network, e.g. steps V) to VII), including possible substeps, and
- a computer program product having program code means, wherein the program code means can be stored or are stored on a storage medium, for performing the method for measuring an analyte concentration in a sample of bodily fluid according to one of the embodiments described in this description, if the program code means are executed on a computer or on a computer network, e.g. steps V) to VII), including possible substeps.

In a further aspect of the present invention, a mobile device is disclosed. The mobile device comprises
- at least one camera;
- at least one illumination source; and
- at least one processor.

The mobile device is configured for performing the method for measuring an analyte concentration in a sample of bodily fluid as described herein, e.g. according to any one of the embodiments described above and/or described in further detail below, in conjunction with a test strip according to the present invention.

For most of the terms used herein and for possible definitions, reference may be made to the description of the method for measuring an analyte concentration in a sample of bodily fluid given above or as further described below.

As an example, the processor may comprise program means for fully or partially performing the method for measuring an analyte concentration in a sample of bodily fluid as disclosed above or as further disclosed below. Specifically, the program means may be configured for performing steps V) to VII) of the method.

In a further aspect a kit for detecting at least one analyte in at least one sample is disclosed.

The kit comprises the mobile device according to the present invention and at least one optical test strip according to the present invention. For most of the terms used herein and for possible definitions, reference may be made to the description of test strip, the method for producing the test strip, the method for measuring an analyte concentration in a sample of bodily fluid and/or the description of the mobile device given above or as further described below.

In particular, the mobile device may further comprise at least one illumination source. Specifically, the at least one illumination source of the mobile device may be configured for illuminating an object, such as the optical test strip, when taking an image of the object, e.g. the optical test strip, using the mobile device.

Further, the kit, specifically the mobile device, may comprise at least one processor. The processor, as an example, may be configured for performing method steps V) to VII) of the method for measuring an analyte concentration in a sample of bodily fluid applied to a test field of an optical test strip by using a mobile device, as described above or as further described below.

The devices and methods according to the present invention may provide a large number of advantages over known methods and devices for measuring an analyte concentration in a sample of bodily fluid. Thus, the methods and devices allow for reliable and enhanced measurement of the analyte concentration without the need of additional images and tools such as modules or reference cards. The handling of the test strip during measurement may be enhanced and manufacturing costs can be reduced.

Summarizing and without excluding further possible embodiments, the following embodiments may be envisaged:

Embodiment 1: An optical test strip for measuring an analyte concentration in a sample of bodily fluid, comprising:
  a) a bottom layer having a first end;
  b) a top layer having a first end aligned with the first end of the bottom layer;
  c) at least one spacer layer interposed between the bottom layer and the top layer, the spacer layer having a length shorter than the bottom layer and shorter than the top layer such that the top layer and the bottom layer protrude over the spacer layer, wherein the first end of the bottom layer, the first end of the top layer, and the spacer layer form a sample receiving area which at least partially has capillary properties for receiving the sample of bodily fluid; and
  d) at least one test field, wherein the test field comprises a test chemical being configured for performing an optically detectable detection reaction with the analyte, wherein the test field comprises at least one first region and at least one second region, wherein the first region faces the sample receiving area, wherein the first region is configured to be at least partly wetted by the sample of bodily fluid upon sample application, wherein the second region is covered by the spacer layer such that the second region is essentially inaccessible for the sample of bodily fluid.

Embodiment 2: The optical test strip according to the preceding embodiment, wherein the first region and the second region of the test field are located in close proximity.

Embodiment 3: The optical test strip according to any one of the preceding embodiments, wherein the first region and the second region of the test field are arranged adjacent to one another.

Embodiment 4: The optical test strip according to any one of the preceding embodiments, wherein the first region and the second region have essentially the same spectral and/or spectroscopic characteristics and/or reflective and/or absorption properties.

Embodiment 5: The optical test strip according to any one of the preceding embodiments, wherein the top layer comprises at least one top foil.

Embodiment 6: The optical test strip according to any the preceding embodiment, wherein the top foil is transparent and has low reflective properties.

Embodiment 7: The optical test strip according to any one of the two preceding embodiments, wherein the top foil comprises at least one material selected from the group consisting of: Polyesters (e.g. a Polyethylene terephthalate (PET)), Polymethacrylates (e.g. PMMA) Polyolefines (e.g. Polyethylene, Polypropylene), Polycarbonates, Polyamides, Cellulose or derivatives thereof (e.g. Cellophane®), Polyvinylchloride, Polystyrene, or combinations thereof, or flexible glass e.g. ultra-thin glass Embodiment 8: The optical test strip according to any one of the preceding embodiments, wherein the test field is adhered to the top layer by at least one transparent adhesive layer.

Embodiment 9: The optical test strip according to any one of the preceding embodiments, wherein the spacer layer comprises Polyesters (e.g. Polyethylene terephthalate (PET)), Polymethacrylates (e.g. PMMA) Polyolefines (e.g. Polyethylene, Polypropylene), Polycarbonates, Polyamides, Cellulose or derivatives thereof (e.g. Cellophane®), Polyvinylchloride, Polystyrene, or combinations thereof.

Embodiment 10: The optical test strip according to any one of the preceding embodiments, wherein the optical test strip comprises at least one capillary element, wherein the capillary element is formed by a gap between the top layer and the bottom layer bordered by an edge of the spacer layer.

Embodiment 11: The optical test strip according to the preceding embodiment, wherein a height of the capillary element is defined by a thickness of the spacer layer.

Embodiment 12: The optical test strip according to any one of the two preceding embodiments, wherein the capillary element is open at three sides.

Embodiment 13: The optical test strip according to any one of the preceding embodiments, wherein the sample receiving area is a full-width end dose application area.

Embodiment 14: The optical test strip according to any one of the three preceding embodiments, wherein at least one inner surface of the capillary element is coated with a hydrophilic coating.

Embodiment 15: The optical test strip according to any one of the preceding embodiments, wherein the bottom layer comprises at least one bottom foil, wherein the bottom foil is opaque.

Embodiment 16: The optical test strip according to any one of the preceding embodiment, wherein the length of the bottom layer extends beyond the length of the top layer or wherein the length of the top layer extends beyond the length of the bottom layer.

Embodiment 17: The optical test strip according to any one of the preceding embodiments, wherein the test strip comprises at least one supporting spacer which is arranged between the top layer and the spacer layer.

Embodiment 18: The optical test strip according to any one of the preceding embodiments, wherein the test strip comprises at least one imprint, wherein the imprint comprises at least one element selected from the group consisting of: at least one barcode, at least one 2D-label, at least one 3D-label; at least one reference color, at least one thermochromic imprint or label configured for changing its color depending on temperature.

Embodiment 19: The optical test strip according to the preceding embodiment, wherein the imprint comprises at least one information selected from the group consisting of: a batch or lot information, a code information, a safety identification information, spatial location.

Embodiment 20: The optical test strip according to any one of the preceding embodiments, wherein the test strip comprises at least one wavelength filter component, wherein the wavelength filter component is selected from the group consisting of a longpass filter component and a bandpass filter component.

Embodiment 21: The optical test strip according to the preceding embodiment, wherein the test field comprises at least one carrier foil carrying the test chemical, wherein the wavelength filter component is located within the carrier foil, specifically the wavelength filter component is dispersed within the carrier foil.

Embodiment 22: The optical test strip according to any one of the two preceding embodiments, wherein the test strip comprises at least one transparent adhesive layer, wherein the wavelength filter component is located within the transparent adhesive layer, specifically the wavelength filter component is dispersed within the transparent adhesive layer.

Embodiment 23: The optical test strip according to any one of the preceding embodiments, wherein the test field has a shape which is selected from the group consisting of: a rectangular shape; a square shape; a round shape; a circular shape.

Embodiment 24: A method for producing an optical test strip according to any one of the preceding embodiments, the method comprising the following steps:
  i) providing a top layer;
  ii) providing at least one test field, wherein the test field comprises a test chemical being configured for performing an optically detectable detection reaction with the analyte, wherein the test field comprises at least one first region and at least one second region;
  iii) attaching the test field to the top layer;
  iv) providing at least one spacer layer and arranging the spacer layer such that the first region remains uncovered by the spacer layer and the second region is covered by the spacer layer such that the second region is essentially inaccessible for the sample of bodily fluid;
  v) providing a bottom layer having a first end, aligning the first end of the bottom layer with a first end of the top layer and attaching the bottom layer to the spacer layer such that the spacer layer is interposed between the bottom layer and the top layer, the spacer layer having a length shorter than the bottom layer and shorter than the top layer such that the top layer and the bottom layer protrude over the spacer layer wherein the first end of the bottom layer, the first end of the top layer, and the spacer layer form a sample receiving area which at least partially has capillary properties for receiving the sample of bodily fluid, wherein the first region faces the sample receiving area.

Embodiment 25: The method according to the preceding embodiment, wherein in step iii) the test field is attached to the top layer using at least one transparent adhesive layer.

Embodiment 26: The method according to any one of the preceding embodiments referring to a method for producing an optical test strip, wherein step iv) further comprises arranging at least one supporting spacer between the top layer and the spacer layer, wherein the supporting spacer is attached to the top layer using at least one transparent adhesive.

Embodiment 27: The method according to any one of the preceding embodiments referring to a method for producing an optical test strip, wherein the method comprises placing at least one imprint on the test strip, wherein the imprint comprises at least one element selected from the group consisting of: at least one barcode, at least one 2D-label, at least one 3D-label; at least one reference color, at least one thermochromic imprint or label configured for changing its color depending on temperature, wherein the imprint is placed on the spacer layer and/or the supporting spacer facing the top layer, wherein the placing of the imprint is performed before attaching the spacer layer and/or the supporting spacer to the top layer.

Embodiment 28: A method for measuring an analyte concentration in a sample of bodily fluid applied to a test field of an optical test strip by using a mobile device, comprising:
  I. providing an optical test strip having at least one spacer layer interposed between a bottom layer and a top layer, the optical test strip comprising at least one test field, wherein the test field comprises a test chemical being configured for performing an optically detectable detection reaction with the analyte, wherein the test field comprises at least one first region and at least one second region, wherein the first region is configured to be at least partly wetted by the sample of bodily fluid upon sample application, wherein the second region is covered by the spacer layer such that the second region is essentially inaccessible for the sample of bodily fluid;
  II. providing the mobile device, wherein the mobile device comprises at least one camera,
  III. applying the sample of bodily fluid to the test field;
  IV. capturing at least one image of the first region and second region of the test field by using the camera of the mobile device;
  V. determining a reference value of the second region of the test field by evaluating at least one reference region of the captured image corresponding to the second region;
  VI. determining a measurement value by evaluating at least one measurement region of the captured image corresponding to the first region of the test field; and
  VII. determining the analyte concentration of the sample of the bodily fluid using the measurement value and the reference value.

Embodiment 29: The method according to the preceding embodiment, wherein the analyte concentration of the sample of the bodily fluid is determined from a quotient of the measurement value and the reference value.

Embodiment 30: The method according to any one of the preceding embodiments referring to a method for measuring an analyte concentration in a sample of bodily fluid, wherein the mobile device further comprises at least one illumination source, wherein method step IV) further comprises illuminating the optical test strip.

Embodiment 31: The method according to any one of the preceding embodiments referring to a method for measuring an analyte concentration in a sample of bodily fluid, wherein the optical test strip comprises an optical test strip according to any one of the preceding embodiments referring to an optical test strip.

Embodiment 32: A computer program comprising program means for fully or partially performing the method for measuring an analyte concentration in a sample of bodily fluid according to any one of the preceding embodiments referring to a method for measuring an analyte concentration in a sample of bodily fluid, while the computer program is being executed on a computer or on a computer network.

Embodiment 33: A mobile device, comprising:
  at least one camera;
  at least one illumination source; and
  at least one processor,
  wherein the mobile device is configured for performing the method for measuring an analyte concentration in a sample of bodily fluid according to any one of the preceding embodiments referring to a method for measuring an analyte concentration in a sample of bodily fluid in conjunction with an optical test strip according to any one of the preceding embodiments referring to an optical test strip having at least one test field, the test field comprising at least one test chemical for performing an optical detection reaction in the presence of the analyte Embodiment 34: A kit for measuring an analyte concentration in a sample of bodily fluid, the kit comprising an optical test strip according to any one of the preceding embodiments referring to an optical test strip and the kit further comprising a mobile device, wherein the mobile device comprises at least one camera.

Embodiment 35: The kit according to the preceding embodiment, wherein the kit comprises at least one processor configured for performing method steps V) to VII) of the method according to any one of the preceding embodiments referring to a method for measuring an analyte concentration in a sample of bodily fluid.

Short Description of the Figures

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

IN THE FIGURES

FIGS. 1A to D show top views of embodiments of a top layer (FIG. 1A), test field and spacer layer (FIG. 1B), bottom layer (FIG. 1C) of an optical test strip for measuring an analyte concentration in a sample of bodily fluid and a top view of the assembled optical test strip (FIG. 1D);

DETAILED DESCRIPTION OF THE EMBODIMENTS

Figure 1:
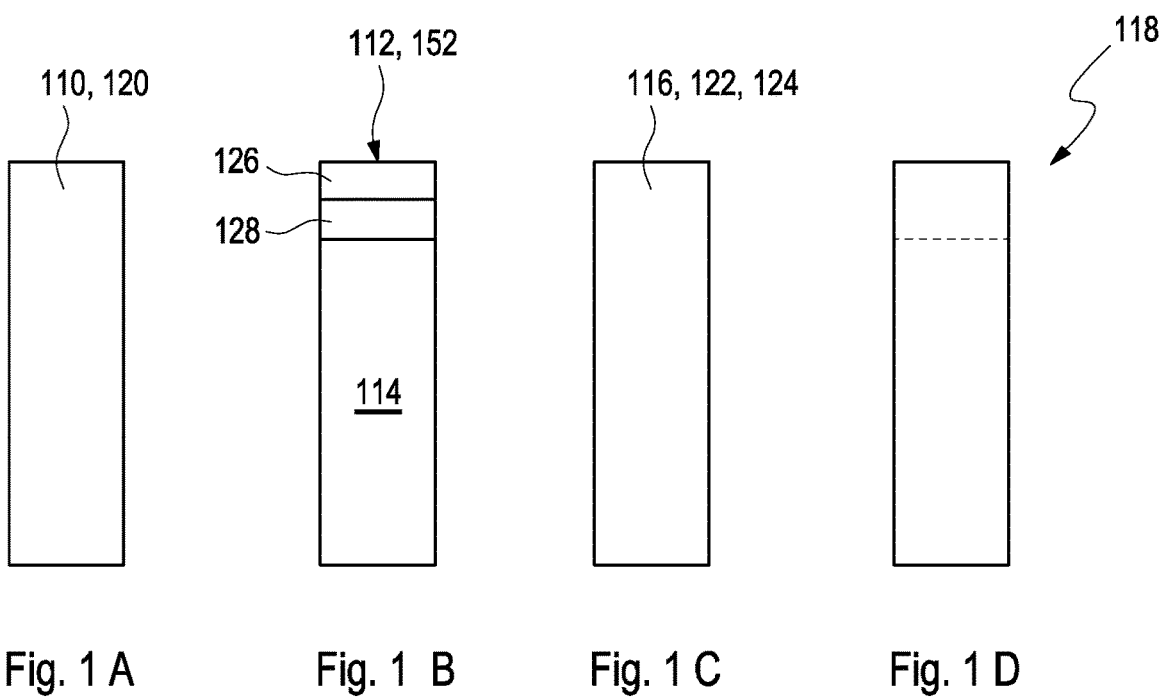

FIGS. 1A to D show, in a highly schematic fashion, top views of embodiments of a top layer 110, FIG. 1A, test field 112 and spacer layer 114, FIG. 1B, bottom layer 116, FIG. 1C, of an optical test strip 118 for measuring an analyte concentration in a sample of bodily fluid 120 and a top view of the assembled optical test strip 118, FIG. 1D. The optical test strip 118 may particularly be configured for performing a color-change detection reaction and thereby providing optically detectable information on the analyte concentration. As an example, the optical test strip 118 may particularly be strip shaped, thus, the test strip 118 may have a long and narrow shape.

Figure 2:
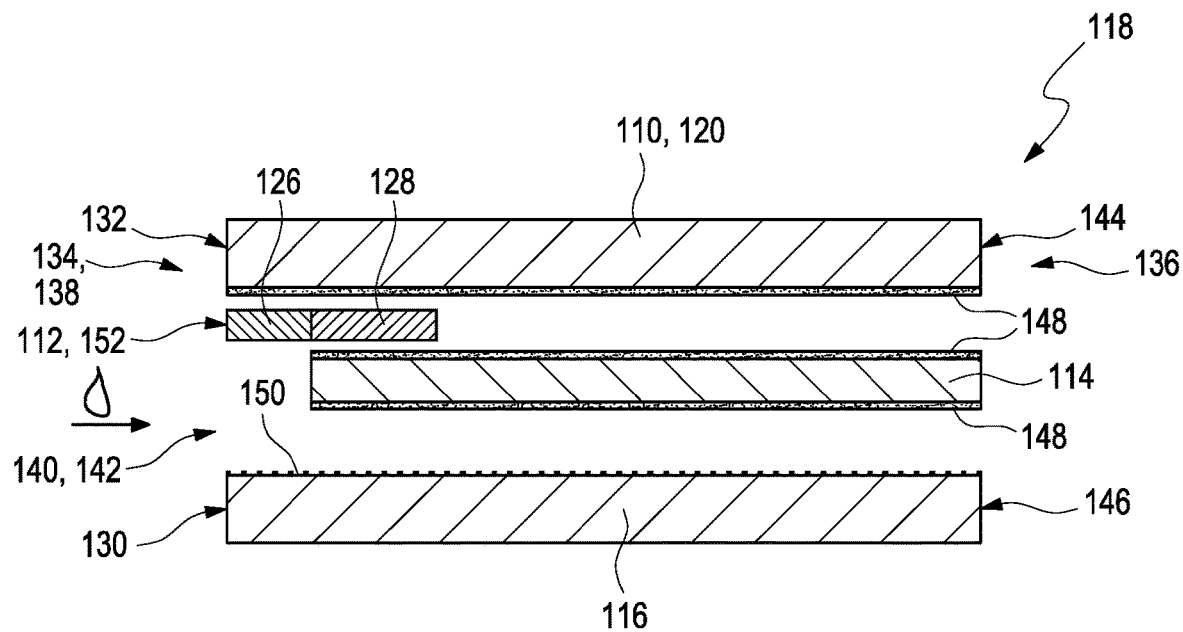
FIG. 2 shows a sectional view of an embodiment of the optical test strip.
Figure 3:
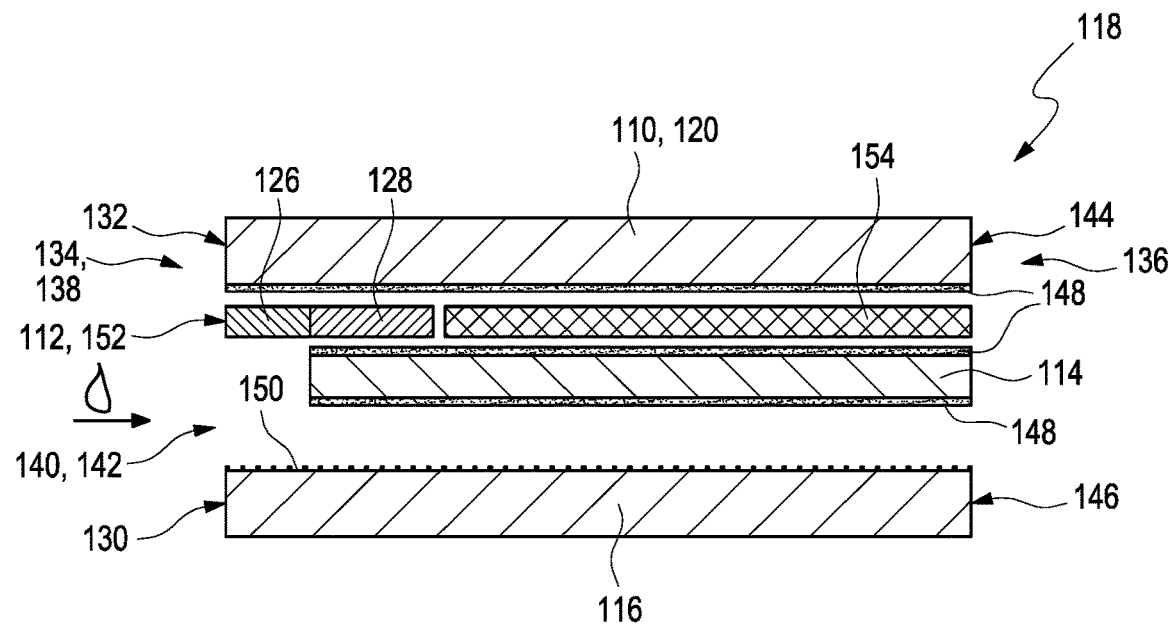
FIG. 3 shows a sectional view of a further embodiment of the optical test strip.
Figure 4:
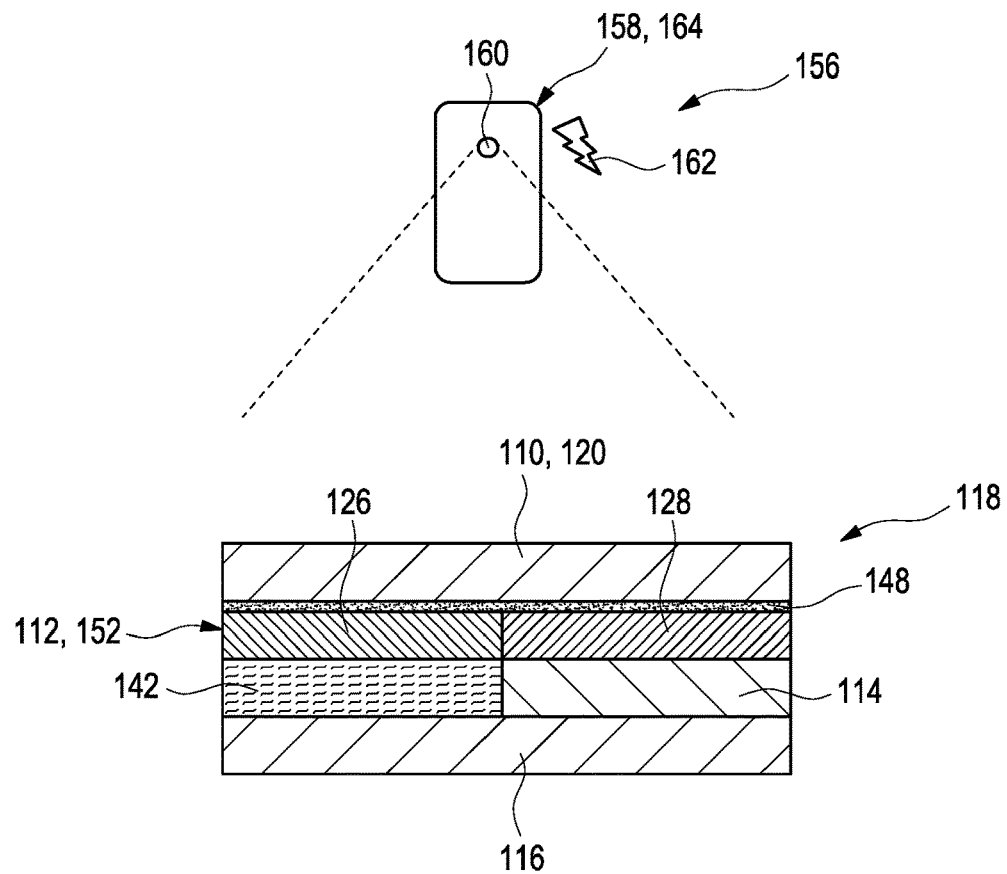
FIG. 4 shows an embodiment of a kit for measuring an analyte concentration in a sample of bodily fluid in a schematic view.

The test strip 118 may comprise a layer setup, see for example FIGS. 2 to 4. The test strip 118 may have a layered test strip architecture. FIG. 1A shows the top layer 110 of the test strip 118 which confines the layer setup of the test strip 118 at a top side of the test strip 118. The top layer 110 may comprise at least one top foil 120. The top foil 120 may be transparent, specifically fully or partially transparent for visible light. For example, the top foil 120 may be fully transparent. The transparent top foil 120 may allow that the test field 112 which is arranged in the layer setup below the top foil 120 is visible in the top view, see FIG. 1D. The top foil 120 may have low reflective and/or specular properties. The top foil 120 may be anti-reflective and/or may comprise at least one anti-reflective coating. The top foil 120 may be configured to minimize reflections in case of illumination with high brightness. The top foil 120 may be configured to reduce errors and/or artefacts due to reflection effects caused e.g. by flashlight of a camera and/or bright sunlight. The top foil 120 may comprise at least one material selected from the group consisting of: Polyesters (e.g. Polyethylene terephthalate (PET)), Polymethacrylates (e.g. PMMA) Polyolefines (e.g. Polyethylene, Polypropylene), Polycarbonates, Polyamides, Cellulose or derivatives thereof (e.g. Cellophane®), Polyvinylchloride, Polystyrene, or combinations thereof, or flexible glass e.g. ultra-thin glass. The top layer 110 may be mechanical stable to avoid bending of the test strip 118 and/or to provide protection to other components of the test strip. The top layer 110 may specifically have a strip-shape, e.g. a shape of a rectangular strip.

FIG. 1C shows the bottom layer 116 which may be or may comprise a test strip carrier 122. The test strip carrier 122 may be configured to provide stabilizing means to the optical test strip 118, specifically to the test field 112. The bottom layer 116 specifically may have a strip-shape, e.g. a shape of a rectangular strip. The bottom layer 116, as an example, may be flexible and/or deformable. The bottom layer 116, as an example, may have a width, e.g. a lateral extension perpendicular to a longitudinal axis of the test strip, of 1 mm to 20 mm, e.g. 2 mm to 5 mm. The bottom layer 116 further may have a length, e.g. a longitudinal extension of 10 mm to 70 mm, e.g. 15 mm to 50 mm. The length may exceed the width by e.g. a factor of at least 1.5. The bottom layer further may have a thickness of 100 micrometers to 2 mm, e.g. 500 micrometers to 1 mm. The bottom layer 116 may fully or partially be made of at least one material such as one or more of a plastic material, a ceramic material or a paper. The bottom layer 116 may comprise at least one bottom foil 124. Specifically, the bottom layer 116 may fully or partially be made of at least one plastic foil. The bottom layer 116 may be made of a single layer or of a plurality of layers. The bottom layer 116 specifically, the bottom foil 124, may be opaque, such as by comprising at least one material which is fully or partially intransparent for visible light. The bottom layer 116 may be uniform and/or homogenous, specifically uniform and/or homogenous in color and/or reflective properties and/or other surface properties. The bottom layer 116 may be configured to provide a homogenous and white background for the test field 112. Thus, a background of the test field 112 may be identical and less dependent on changes in brightness in the background. Specifically, the background of the test field 112 may be independent from backlight illumination.

FIG. 1B shows a top view of the test field 112 on top of the spacer layer 114. The test strip comprises the at least one spacer layer 114 interposed between the bottom layer 116 and the top layer 110. The spacer layer may be configured for separating the top layer 110 and the bottom layer 116. The spacer layer 116 may comprise Polyesters (e.g. Polyethylene terephthalate (PET)), Polymethacrylates (e.g. PMMA) Polyolefines (e.g. Polyethylene, Polypropylene), Polycarbonates, Polyamides, Cellulose or derivatives thereof (e.g. Cellophane®), Polyvinylchloride, Polystyrene, or combinations thereof.

The test field 112 comprises a test chemical being configured for performing an optically detectable detection reaction with the analyte. The test field 112 may have at least one amount of the test chemical for detecting at least one analyte. The test field 112, as an example, may comprise at least one layer comprising the test chemical. As an example, the test field 112 may comprise an arbitrary layered element, having a layered structure, with the test chemical being comprised by at least one layer of the layered structure. The test field 112 may be a field of round, polygonal or rectangular shape and having one or more layers of material, with at least one layer of the test field 112 having the test chemical applied thereto.

The test field may comprise at least one first region 126 and at least one second region 128.

The first region 126 is configured to be at least partly wetted by the sample of bodily fluid upon sample application. The second region 128 is covered by the spacer layer 114 such that the second region 128 is essentially inaccessible for the sample of bodily fluid. Further description of the layer setup of the optical test strip 118 is given with respect to FIGS. 2 to 4 below.

FIG. 2 shows a sectional view of an exemplary layer setup of the test strip 118, in a highly schematic fashion. As shown in FIG. 2, the test strip 118 comprises the bottom layer 116 having a first end 130 and the top layer 110 having a first end 132 aligned with the first end 130 of the bottom layer 116. The test strip 118 may have a proximal end 134 and a distal end 136. The proximal end 134 may be located at a sample application side 138 of the test strip 118, wherein the distal end 136 may be located at an opposite side of the test strip 118.

The first end 132 of the top layer 110 and the first end 130 of the bottom layer 116 may be aligned to form upper and lower walls of a sample receiving area 140. A capillary element 142 may be formed such that an upper wall of the capillary element 142 may be defined by the foil comprising the test chemical. The bottom layer 116 and the top layer 110 may have an identical and/or aligned shape. The bottom layer 116 and the top layer 110 may have different length. For example, the length of the bottom layer 116 may extend beyond the length of the top layer 110. Thus, the bottom layer 116 may protrude over the top layer 110 at the proximal end 134 of the test strip 118. For example, the length of the top layer 110 may extend beyond the length bottom layer 116. Thus, the top layer 110 may protrude over to the bottom layer 116 at the proximal end 134 of the test strip 118. The top layer 110 and bottom layer 116 having different length may allow enhanced handling, specifically facilitates sample application, and faster sample collection.

The top layer 110 may have a second end 144, wherein the second end 144 is an end opposite to the first end 132 of the top layer 110. The bottom layer 116 may have a second end 146, wherein the second end 146 is an end opposite to the first end 130 of the bottom layer 116. The second end 144 may be aligned with the second end 146 such that the distal end 136 of the test strip 118 may have an essentially flat edge which is formed by the second end 144 of the top layer 110 and the second end 146 of the bottom layer 116. Other embodiments are feasible, such as embodiments wherein the test element 118 comprises at least one holder, such as the bottom layer 116 may protrude over the other layers of the layer setup, at the distal end 136.

As further shown in FIG. 2, the spacer layer 114 is interposed between the bottom layer 116 and the top layer 110. The spacer layer 114 has a length shorter than the bottom layer 116 and shorter than the top layer 110 such that the top layer 110 and the bottom layer 116 protrude over the spacer layer 114. Specifically, the spacer layer 114 may not extend up to an outer edge of the first end 130 of the bottom layer 116 nor to an outer edge of the first end 132 of the top layer 110. The first end 130 of the bottom layer 116, the first end 132 of the top layer 110, and the spacer layer 114 form the sample receiving area 140 which at least partially has capillary properties for receiving the sample of bodily fluid. The optical test strip 118 may comprise the at least one capillary element 142. The capillary element 142 may comprise at least one volume configured to receive the sample of the body fluid, e.g. one or more capillary caps and/or one or more capillary slots and/or one or more capillary tubes having an arbitrary cross-section, such as a rectangular cross-section and/or a rounded cross-section and/or a polygonal cross-section. The capillary element 142 may be formed by a gap between the top layer 110 and the bottom layer 116 bordered by an edge of the spacer layer 114. A height of the capillary element 142 may be defined by a thickness of the spacer layer 114. The thickness of the spacer layer 114 may be selected such that the capillary element 142 is high enough to allow rapid receiving of the sample even in case of high hematocrit values. The thickness of the spacer layer 114 may be selected such that a small sample volume can be ensured. For example, the thickness of the spacer layer 114 may be from 70 micrometers to 200 micrometers, preferably from 90 micrometers to 130 micrometers. The spacer layer 114 and/or a surface of the top foil 120 facing the spacer layer 114 may comprise at least one adhesive coating 148, specifically a DURO-TAK® coating.

The capillary element 142 may be open at three sides. As outlined above, the spacer layer 114 has a length shorter than the bottom layer 116 and shorter than the top layer 110 such that the top layer 110 and the bottom layer 116 protrude over the spacer layer 114. The sample receiving area 140 may be a full-width end dose application area. The test strip 118 may be configured such that the sample of the body fluid may be applicable to a side dose position and/or to a front dose position. Specifically, as outlined above, the capillary element 142 may be open at a front side at the proximal end 134 of the test strip 118 and at two opposing sides extending along a length of the capillary element 142. The test strip 118 may comprise a side dose position at each of the opposing sides of the capillary element 142. A side dose position may be an ideal application position for capillary blood from a finger stick. For example, the front dose position may be an open side at the front face, i.e. at a front side at the proximal end 134 of the test strip 118. Using a test strip 118 having a capillary element 142 which can receive the sample at three sides of the test strip 118 at the proximal end 134 of the test strip 118 is, specifically, advantageous under hygienic aspects and cleaning and disinfection requirements, specifically reduces blood contaminations in case of depositing the test strip 118 for capturing at least one image of the test field 112. In addition, using the capillary element 142 may ensure that the test strip 118 receives only as much of the sample of bodily fluid as needed and as much of the sample which can be stored within the test strip 118. The capillary element 142 may be configured for transporting the sample of bodily fluid from one or more of the dosing positions to the test field 112. At least one inner surface of the capillary element 142 may be coated with a hydrophilic coating 150, specifically a Dispercoll® coating. This may ensure proper receiving and transport of the capillary element even after storage times.

As further shown in FIG. 2, the test strip 118 comprises the test field 112. The test field 112 may comprise at least one carrier foil 152 carrying the test chemical. However, embodiments may be possible without a carrier foil 152 in which the test chemical may be applied directly to the top layer 110. The carrier foil 152 may be applied to the top layer 110.

The test field 112 may be adhered to the top layer 110 by at least one transparent adhesive layer 148, such as a transparent adhesive layer comprising an adhesive, specifically a DURO-TAK® adhesive. Specifically, the carrier foil 152 may be or may comprise a material having an inherent rigidity. The carrier foil 152 specifically may be made of at least one flexible or deformable material, such as at least one flexible or deformable plastic foil. The plastic foil, as an example, may have a thickness of 10 micrometers to 500 micrometers. The carrier foil 152, specifically, may comprise at least one transparent matrix material, such as at least one transparent plastic material being translucent in the visible spectral range. In particular, the carrier foil 152 may comprise a complex structure, for example a layered structure having one or more layers of material. Thus, the carrier foil 152 may specifically comprise the at least one layer of transparent matrix material. Other layers may be present, for example adhesive layers, such as glue layers or other layers for bonding.

The test field 112 further may comprise at least one test chemical directly or indirectly applied to the carrier foil 152. The test chemical is configured for performing an optically detectable detection reaction with the analyte. The detection reaction specifically may be analyte-specific. The test chemical, in the present case, specifically may be an optical test chemical, such as a color-change test chemical which changes in color in the presence of the analyte. The color change specifically may depend on the amount of analyte present in the sample. The test chemical, as an example, may comprise at least one enzyme, such as glucose oxidase and/or glucose dehydrogenase. Additionally, other components may be present, such as one or more dyes, mediators and the like. Test chemicals are generally known to the skilled person and reference may be made to J. 20 Hönes et al.: Diabetes Technology and Therapeutics, Vol. 10, Supplement 1, 2008, pp. 10-26. Other test chemicals, however, are feasible, too.

The first region 126 of the test field 112 faces the sample receiving area 140. Specifically, the first region 126 may be in contact with the sample receiving area 140, in particular with the capillary element 142, in order to receive the sample of bodily fluid upon application. The first region 126 is configured to be at least partly wetted by the sample of bodily fluid upon sample application. The first region 126 may be located in close proximity to the proximal end 134 of the test strip 118. This may allow using a short capillary element 142. The second region 128 is covered by the spacer layer 114 such that the second region 128 is essentially inaccessible for the sample of bodily fluid. The first region 126 and the second region 128 of the test field 112 may be located in close proximity, preferably adjacent to one another. Specifically, the first region 126 and the second region 128 may be arranged such that it may be possible to record one single image comprising the first region 126 and the second region 128. The first region 126 and the second region 128 may be arranged successively along an elongated extension of the test strip 118.

The second region 128 may be a dry blank field. An image of the dry blank field may be used as reference value for ambient light conditions such as angle of incidence, light color, brightness, or for other effects such as light reflection, geometrical factors, aging of the test strip 118 or components of the test strip 118 or the like. The first region 126 and the second region 128 may be arranged such that they can be imaged in a single image at the same time. This may ensure that ambient light conditions and other conditions are identical for both the to imaged wetted first region 126 and its reference image of the second region 128. By using a dry blank field integrated in the test strip 118, specifically in the test field 112, it may be possible to record a single image at the same time of the wetted test field 112 region and a corresponding dry reference region. This may allow performing ambient light corrections and corrections for other effects within one image, and, thus, to enhance reliability of the measurement results. The test chemical of the test field 112 may be used as reference color.

In addition, further reference colors may be used. For example, a reference color field such as a white field may be used. Thus, it may be possible to gain additional color information for an image analysis and/or evaluation algorithm for analyzing the image of the test field 112 for measuring the analyte concentration. Specifically, it may be possible to determine a reference image without recording additional images, e.g. before or after recording the image of the first region 126. Furthermore, correction for ambient light and other effects may be possible without additional tools such as additional hardware or color quality cards. Thus, it may be possible to omit color quality control which may allow reducing costs. Visibility of the dry blank field in the same image with the wetted test field 112 may allow using optimized image analysis, specifically using neural networks such as Deep Learning. The first region 126 and the second region 128 may have essentially the same spectral and/or spectroscopic characteristics and/or reflective and/or absorption properties. This may allow more precise and accurate corrections as compared to using reference fields such as printed reference colors. The image of the dry blank field may further be used for failsafe. The image of the dry blank field may be used to determine whether the color of the test field 112 has changed such that no correct color change may be measurable upon sample application, e.g. in case the test strip was exposed to light for a certain time period. After taking the image an algorithm may check the color of the dry blank field after white balance and may compare it with the expected origin color. If a significant color change may be recognized which lies above a defined threshold, e.g. because light exposure has damaged sensitive chromophores or has initiated colored byproducts, an error notification may be issued in order to request a new test strip.

FIG. 3 shows a sectional view of a further embodiment of the test strip 118. With respect to design of the layer setup and respective layers reference is made to the description of FIGS. 1A to 1D and FIG. 2 above. In this embodiment, in addition, the test strip 118 may comprise at least one supporting spacer 154 which is arranged between the top layer 110 and the spacer layer 114. When assembling the top layer 110, spacer layer 114 and test field 112 a gap may occur in a longitudinal direction behind the test field 112 in between the spacer layer 114 and the top layer 110. The supporting spacer 154 may be adapted to fill this gap at least partially, to enhance mechanical stability and also may simplify the process of printing e.g. a barcode.

FIG. 4 shows, in a highly schematic fashion, an embodiment of a kit 156 for measuring an analyte concentration in a sample of bodily fluid in a schematic view. The kit 156 comprises at least one mobile device 158 and the at least one optical test strip 118. In FIG. 4 only a part of the test strip 118 comprising the test field 112 is shown. With respect to design and embodiments reference is made to the description of FIGS. 1A to D, FIGS. 2 and 3. In FIG. 4, the test strip 118 is shown with a filled capillary element 142.

The mobile device 158 may be a mobile electronics device, more specifically to a mobile communication device such as a cell phone or smart phone. Additionally or alternatively, the mobile device 158 may also refer to a tablet computer or another type of portable computer having at least one camera. The mobile device 158 comprises at least one camera 160. The camera 160 may have at least one imaging element configured for recording or capturing spatially resolved one-dimensional, a two-dimensional or even three-dimensional optical information. As an example, the camera 160 may comprise at least one camera chip, such as at least one CCD chip and/or at least one CMOS chip configured for recording images. The camera 160 specifically may be a color camera. Thus, e.g. for each pixel, color information may be provided or generated, such as color values for three colors R, G, B. A larger number of color values is also feasible, such as four colors for each pixel. Color cameras are generally known to the skilled person. Thus, as an example, each pixel of the camera chip may have three or more different color sensors, such as color recording pixels like one pixel for red (R), one pixel for yellow (G) and one pixel for blue (B). For each of the pixels, such as for R, G, B, values may be recorded by the pixels, such as digital values in the range of 0 to 255, depending on the intensity of the respective color. Instead of using color triples such as R, G, B, as an example, quadruples may be used, such as C, M, Y, K. These techniques are generally known to the skilled person.

The mobile device 158 may further comprise at least one illumination source which is denoted with reference number 162. Specifically, the at least one illumination source 162 of the mobile device may be configured for illuminating an object, such as the optical test strip 118, when taking an image of the object, e.g. the optical test strip 118, using the mobile device 158. For example, upon application of the sample of bodily fluid to the test field 112, the camera 160 of the mobile device 158 may capture at least one image of the first region 126 and second region 128 of the test field 112.

Further, the kit 156, specifically the mobile device 158, may comprise at least one processor 164. The processor 164 may be configured for determining a reference value of the second region 128 of the test field 112 by evaluating at least one reference region of the captured image corresponding to the second region 128. The processor 164 may be adapted to perform at least one image analysis algorithm for selecting the reference region and for evaluating the reference value. The processor 164 may be configured for determining a measurement value by evaluating at least one measurement region of the captured image corresponding to the first region 126 of the test field 112. The processor 164 may be adapted to perform at least one image analysis algorithm for selecting the measurement region and for evaluating the measurement value. With respect to image analysis and evaluation of the measurement value reference is made e.g. to European patent application no. EP 17198290.3, filed on Oct. 25, 2017, to international patent application PCT/EP2018/078956, filed on Oct. 23, 2018, to European patent application no. EP 17198287.9, filed on Oct. 25, 2017, to international patent application PCT/EP2018/079079, to European patent application no. EP 18187931.3, filed on Aug. 8, 2018, to European patent application no. EP 18157426.0, filed on Feb. 19, 2018 and to European patent application no. EP 18158626.4, filed on Feb. 26, 2018, the full content of which is herewith included by reference.

The processor 164 may be configured for determining the analyte concentration of the sample of the bodily fluid using the measurement value and the reference value. The processor 164 may be configured for performing at least one evaluation algorithm for evaluating the color value of the measurement region. The evaluation algorithm may comprise a plurality of input parameters which may be considered during performing the evaluation algorithm. The input parameter may be at least one parameter selected from the group consisting of: the reference value of the second region of the test field, a temperature range which may be determined by using thermocromic imprints, further color reference values such as of at least one further reference color field, additional information about aging, batch and the like determined, for example, by reading information from an imprint of the test strip. The performing of the evaluation algorithm may comprise using at least one neural network. The evaluation algorithm may comprise at least one failsafe, wherein outlier are detected and examined. The analyte concentration BG of the sample of the bodily fluid may be determined from a quotient of the measurement value MV and the reference value RV, specifically by BG~MV/RV. With respect to determination of the analyte concentration reference is made e.g. to European patent application no. EP 17198290.3, filed on Oct. 25, 2017, to international patent application PCT/EP2018/078956, filed on Oct. 23, 2018, to European patent application no. EP 17198287.9, filed on Oct. 25, 2017, to international patent application PCT/EP2018/079079, to European patent application no. EP 18187931.3, filed on Aug. 8, 2018, to European patent application no. EP 18157426.0, filed on Feb. 19, 2018 and to European patent application no. EP 18158626.4, filed on Feb. 26, 2018, the full content of which is herewith included by reference.

Figure 5:
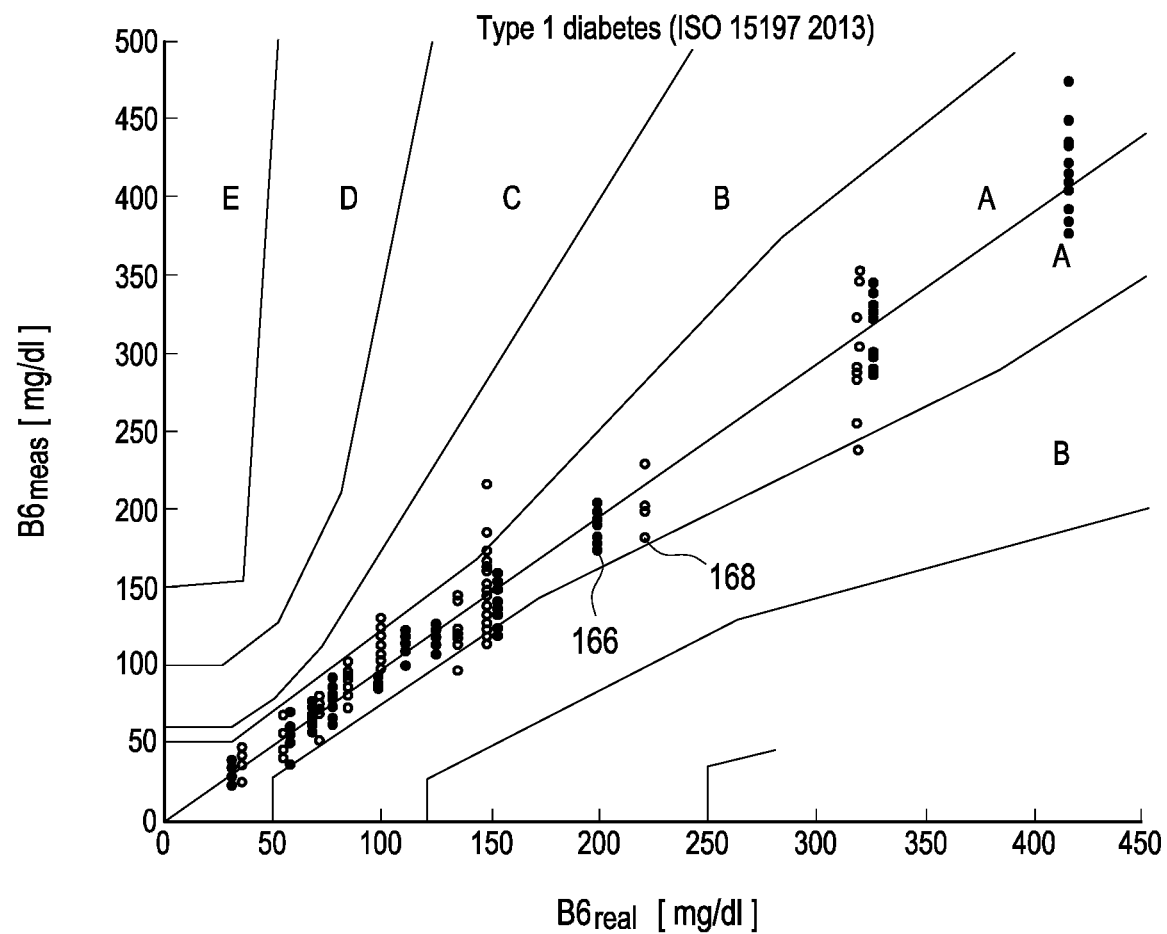
FIG. 5 shows experimental results of the measured blood glucose vs the real blood glucose for different blood glucose concentrations.

FIG. 5 shows experimental results of the measured blood glucose BGmeas vs the real blood glucose BGreai for different blood glucose concentrations for optical test strips 118 according to the present invention (reference number 166) and for an ACCU-CHEK® Active test strips (reference number 168). The test strips may comprise identical test chemical. For the experimental setup of the test strip 118, the spacer layer 114 was selected such that the height of the capillary element 142 has a mean value of 127 micrometers ±10 micrometers. The capillary element 142 was selected to have a length of 2.5 mm, resulting a blood volume of 2 µl. However, thinner spacer layers 114 may be possible. As mobile device 158 a Samsung® J7 smartphone was used. Test strips of both types were illuminated by the illumination source 162 of the mobile device 158 under constant light conditions and the respective test field was captured using the camera 160 of the mobile device. In the experiment the ACCU-CHEK® Active test strips is imaged before and after the measurement, whereas the optical test strips 118 according to the present invention is only imaged once. Thus, for both types of test strips the same measurement information such as blank field vs. test field color with identical test chemical was determined. However, using the optical test strips 118 according to the present invention, leads to better results since the first region and the second region were imaged under exactly identical light conditions. In addition, the need of only one image recording reduced error susceptibility and enhances handleability for users. FIG. 5 shows that for the optical test strips 118 according to the present invention 99.2% of the measurements are within a tolerance region of ±20 mg/dl and 96.2% of the measurements are within a tolerance region of ±15 mg/dl. The coefficient of variance was determined as 7.1%. In contrast, for the ACCU-CHEK® Active test strips 92% of the measurements are within a tolerance region of ±20 mg/dl and 78.8% of the measurements are within a tolerance region of ±15 mg/dl. The coefficient of variance was determined as 11.7%. Thus, the optical test strip 118 allow for reliable and enhanced measurement of the analyte concentration without the need of additional images and tools such as modules or reference cards. The handling of the test strip during measurement may be enhanced and manufacturing costs can be reduced.

LIST OF REFERENCE NUMBERS 110 top layer
112 test field
114 spacer layer
116 bottom layer
118 test strip
120 top foil
122 test strip carrier
124 bottom foil
126 first region
128 second region
130 first end
132 first end
134 proximal end
136 distal end
138 sample application side
140 sample receiving area
142 capillary element
144 second end
146 second end
148 adhesive coating
150 hydrophilic coating
152 carrier foil
154 supporting spacer
156 kit
158 mobile device
160 camera
162 illumination source
164 processor
166 value
168 value

The invention claimed is:

1. An optical test strip for measuring an analyte concentration in a sample of bodily fluid, comprising:
   a) a bottom layer having a first end and an upper surface;
   b) a top layer having a first end essentially aligned with the first end of the bottom layer and having a lower surface facing the upper surface of the bottom layer;
   c) at least one spacer layer interposed between the upper surface of the bottom layer and the lower surface of the top layer, the at least one spacer layer having a length shorter than the bottom layer and shorter than the top layer such that the top layer and the bottom layer protrude over the first ends of the at least one spacer layer,
   wherein the first end of the bottom layer, the first end of the top layer, and the at least one spacer layer form a sample receiving area which at least partially has capillary properties for receiving the sample of bodily fluid; and
   d) at least one test field comprising a test chemical which reacts with the analyte to provide an optically detectable detection reaction,
      wherein the at least one test field having a first surface and an opposed second surface, wherein the first surface of the at least one test field faces the top layer, and the opposed second surface faces the bottom layer,
      the at least one test field comprising at least one first region and at least one second region,
      wherein the at least one first region comprises a surface which faces the sample receiving area, wherein the surface of the at least one first region is uncovered by the at least one spacer layer and is exposed to the sample of bodily fluid upon sample application,
      wherein the at least one second region comprises a surface which faces in the same direction as the surface of the at least one first region,
      wherein the surface of the at least one second region is covered by the at least one spacer layer to essentially prevent exposure to the sample of bodily fluid upon sample application, the covering of the at least one second region by the at least one spacer layer essentially preventing a detectable reaction taking place in the at least one second region, and
   the surface of the at least one first region and the surface of the at least one second region are visible in a top view of the optical test strip.

2. The optical test strip according to claim 1, wherein the at least one first region and the at least one second region of the at least one test field are located in close proximity.

3. The optical test strip according to claim 1, wherein the at least one first region and the at least one second region have essentially the same spectral and/or spectroscopic characteristics and/or reflective and/or absorption properties.

4. The optical test strip according to claim 1, wherein the top layer comprises at least one top foil, wherein the at least one top foil is transparent and has low reflective properties.

5. The optical test strip according to claim 4, wherein the at least one top foil comprises at least one material selected from the group consisting of: Polyesters, Polymethacrylates, Polyolefins, Polycarbonates, Polyamides, Cellulose or derivatives thereof, Polyvinylchloride, Polystyrene, or combinations thereof, or flexible glass, and/or wherein the at least one spacer layer comprises Polyesters, Polymethacrylates, Polyolefins, Polycarbonates, Polyamides, Cellulose or derivatives thereof, Polyvinylchloride, Polystyrene, or combinations thereof.

6. The optical test strip according to claim 1, wherein the optical test strip comprises at least one capillary element, wherein a height of the at least one capillary element is defined by a thickness of the at least one spacer layer, wherein the at least one capillary element is open at three sides.

7. The optical test strip according to claim 1, wherein the bottom layer comprises at least one bottom foil, wherein the at least one bottom foil is opaque.

8. The optical test strip according to claim 1, wherein the length of the bottom layer extends beyond the length of the top layer or wherein the length of the top layer extends beyond the length of the bottom layer.

9. The optical test strip according to claim 1, wherein the optical test strip comprises at least one supporting spacer which is arranged between the top layer and the at least one spacer layer.

10. The optical test strip of claim 1 wherein the surface of the at least one first region is uncovered by the at least one spacer layer and is available for the sample of bodily fluid.

11. The optical test strip of claim 10, wherein the surface of the at least one second region is covered by the at least one spacer layer and essentially prevents exposure of the surface of the at least one second portion to bodily fluid.

12. The optical test strip of claim 1 wherein the at least one second region is underneath the at least one spacer layer.

13. The optical test strip of claim 1 wherein the surface of the at least one first region and the surface of the at least one second region are coplanar.

14. The optical test strip of claim 13 wherein the surface of the at least one first region is in close proximity to the surface of the at least one second region.

15. The optical test strip of claim 14 wherein the surface of the at least one first region is contiguous with the at least one second region.

16. The optical test strip of claim 15 wherein the surface of the at least one first region is adjacent to the surface of the at least one second region.

17. The optical test strip of claim 13 wherein the at least one first region and the at least one second region comprise the same test chemical.

18. The optical test strip of claim 17 wherein the surface of the at least one second region is covered by the at least one spacer layer and the surface of the at least one first region is uncovered by the at least one spacer layer.

19. The optical test strip of claim 1, wherein the at least one spacer layer covering the at least one second region is transparent.

20. The optical test strip of claim 1, wherein the top layer does not cover the at least one second region.

21. The optical test strip of claim 1, wherein the top layer covering the at least one second region is transparent.

22. The optical test strip of claim 21, wherein the at least one spacer layer covering the at least one second region is transparent.

23. The optical test strip according to claim 1, wherein the top layer is transparent adjacent the at least one first region of the at least one test field.

24. The optical test strip according to claim 1, wherein the top layer includes a hole adjacent the at least one first region of the at least one test field.

25. The optical test strip according to claim 1, wherein further comprising a transparent adhesive layer between the first region of the at least one test field and the spacer layer.

26. An optical test strip for measuring an analyte concentration in a sample of bodily fluid, comprising:
a) a bottom layer having a first end;
b) a top layer having a first end essentially aligned with the first end of the bottom layer;
c) at least one spacer layer interposed between the bottom layer and the top layer, the at least one spacer layer having a length shorter than the bottom layer and shorter than the top layer such that the top layer and the bottom layer protrude over the at least one spacer layer, wherein the first end of the bottom layer, the first end of the top layer, and the at least one spacer layer form a sample receiving area which at least partially has capillary properties for receiving the sample of bodily fluid; and
d) at least one test field, wherein the at least one test field comprises a test chemical which reacts with the analyte to provide an optically detectable detection reaction, wherein the at least one test field comprises at least one first region and at least one second region,
wherein the at least one first region is configured to be at least partly wetted by the sample of bodily fluid upon sample application, the at least one first region comprising a surface which faces the sample receiving area,
wherein the at least one second region comprises a surface which faces in the same direction as the surface of the at least one first region, wherein the surface of the at least one second region is covered by the at least one spacer layer such that the surface of the at least one second region is essentially inaccessible for the sample of bodily fluid, and
wherein the surface of the at least one first region and the surface of the at least one second region are arranged successively along an elongated extension of the optical test strip,
wherein the at least one second region is visible in a top view of the optical test strip.

27. The optical test strip of claim 26, wherein the at least one first region and the at least one second region have essentially the same spectral and/or spectroscopic characteristics and/or reflective and/or absorption properties.

28. An optical test strip for measuring an analyte concentration in a sample of bodily fluid, comprising:
a) a bottom layer having a first end and an upper surface;
b) a top layer having a first end essentially aligned with the first end of the bottom layer and having a lower surface facing in the direction of the upper surface of the bottom layer;
c) at least one spacer layer interposed between the upper surface of the bottom layer and the lower surface of the top layer, the at least one spacer layer having a length shorter than the bottom layer and shorter than the top layer such that the top layer and the bottom layer protrude over the at least one spacer layer,
wherein the first end of the bottom layer, the first end of the top layer, and the at least one spacer layer form a sample receiving area which at least partially has capillary properties for receiving the sample of bodily fluid; and
d) at least one test field comprising a test chemical which reacts with the analyte to provide an optically detectable detection reaction, the test field having a first surface and an opposed second surface, wherein the first surface of the at least one test field faces the bottom layer, the test field comprising at least one first region and at least one second region,
wherein the at least one first region comprises a lower surface which faces the sample receiving area, wherein the lower surface of the at least one first region is uncovered by the at least one spacer layer and is exposed to the sample of bodily fluid upon sample application,
wherein the at least one second region comprises a lower surface which faces the at least one spacer layer,
wherein the surface of the at least one second region is covered by the at least one spacer layer to essentially prevent exposure to the sample of bodily fluid upon sample application, the covering of the at least one second region by the at least one spacer layer essentially preventing a detectable reaction taking place in the at least one second region, and
the at least one first region comprising an upper surface facing the top layer, the upper surface of the first region being visible in a top view of the optical test strip.

* * * * *